(12) United States Patent
Masuda et al.

(10) Patent No.: US 11,279,443 B2
(45) Date of Patent: Mar. 22, 2022

(54) ELECTRIC COMPONENT FOR HUMAN POWERED VEHICLE AND CONTROL SYSTEM FOR HUMAN POWERED VEHICLE

(71) Applicant: SHIMANO INC., Sakai (JP)

(72) Inventors: Takaya Masuda, Sakai (JP); Syou Tanaka, Sakai (JP)

(73) Assignee: SHIMANO INC., Sakai (JP)

(*) Notice: Subject to any disclaimer, the term of this patent is extended or adjusted under 35 U.S.C. 154(b) by 602 days.

(21) Appl. No.: 15/941,000

(22) Filed: Mar. 30, 2018

(65) Prior Publication Data

US 2019/0300092 A1 Oct. 3, 2019

(51) Int. Cl.
*B62M 25/00* (2006.01)
*B62M 25/08* (2006.01)
*B62J 45/00* (2020.01)
*B62J 45/20* (2020.01)
*B62J 43/30* (2020.01)

(52) U.S. Cl.
CPC .............. *B62M 25/08* (2013.01); *B62J 43/30* (2020.02); *B62J 45/00* (2020.02); *B62J 45/20* (2020.02)

(58) Field of Classification Search
None
See application file for complete search history.

(56) References Cited

U.S. PATENT DOCUMENTS

| | | | |
|---|---|---|---|
| 8,655,561 B2 | 2/2014 | Kitamura | |
| 9,616,964 B2 | 4/2017 | Kasai | |
| 10,457,350 B2 * | 10/2019 | Kasai | B62K 25/28 |
| 10,507,886 B2 * | 12/2019 | Shahana | B62M 6/45 |
| 2009/0102628 A1 * | 4/2009 | Takebayashi | B62M 25/08 |
| | | | 340/432 |
| 2012/0253600 A1 * | 10/2012 | Ichida | B62K 19/36 |
| | | | 701/37 |
| 2014/0102237 A1 * | 4/2014 | Jordan | B62J 99/00 |
| | | | 74/473.12 |
| 2016/0311499 A1 * | 10/2016 | Kasai | B62M 25/08 |
| 2016/0375955 A1 * | 12/2016 | Negoro | B62M 15/00 |
| | | | 701/22 |
| 2017/0203814 A1 * | 7/2017 | Kurokawa | B62K 23/00 |
| 2018/0009508 A1 * | 1/2018 | Suzuki | B62M 6/50 |
| 2018/0043968 A1 * | 2/2018 | Sala | B62K 23/06 |
| 2018/0183255 A1 * | 6/2018 | Shahana | F21S 9/02 |

* cited by examiner

*Primary Examiner* — Truc M Do
(74) *Attorney, Agent, or Firm* — Mori & Ward, LLP

(57) ABSTRACT

An electric component for a human powered vehicle, comprises a transmitter, a receiver, at least one operating member, and a controller. The transmitter is configured to wirelessly transmit wireless signals to an additional electric component. The receiver is configured to wirelessly receive an acknowledgement signal from the additional electric component. The controller is configured to control the transmitter to consecutively transmit one of the wireless signals as a first control signal in response to an operation of the at least one operating member until the receiver receives the acknowledgement signal. The controller is configured to control the transmitter to transmit another of the wireless signals as a second control signal when a first predetermined time period has passed since a time point from when the operation of the at least one operating member is started until when the transmitter starts transmitting the first control signal.

20 Claims, 19 Drawing Sheets

ELECTRIC COMPONENT FOR HUMAN POWERED VEHICLE AND CONTROL SYSTEM FOR HUMAN POWERED VEHICLE

BACKGROUND OF THE INVENTION

Field of the Invention

The present invention relates to an electric component for a human powered vehicle and a control system for a human powered vehicle.

Discussion of the Background

Electric components for human powered vehicles such as bicycles include wireless communication devices attached to bicycle handles to be operated to transmit wireless signals to bicycle components such as derailleurs.

SUMMARY OF THE INVENTION

In accordance with a first aspect of the present invention, an electric component for a human powered vehicle, comprises a transmitter, a receiver, at least one operating member, and a controller. The transmitter is configured to wirelessly transmit wireless signals to an additional electric component for a human powered vehicle. The receiver is configured to wirelessly receive an acknowledgement signal from the additional electric component. The controller is configured to control the transmitter to consecutively transmit one of the wireless signals as a first control signal in response to an operation of the at least one operating member until the receiver receives the acknowledgement signal. The controller is configured to control the transmitter to transmit another of the wireless signals as a second control signal when a first predetermined time period has passed since a time point from when the operation of the at least one operating member is started until when the transmitter starts transmitting the first control signal.

With the electric component according to the first aspect, it is possible to enhance operability of the human powered vehicle, because the electric component consecutively transmits the first control signal until it receives the acknowledgement signal from the additional electric component.

In accordance with a second aspect of the present invention, the electric component according to the first aspect is configured so that the controller is configured to control the transmitter to consecutively transmit the first control signal while the at least one operating member is operated.

With the electric component according to the second aspect, it is possible to further enhance operability of the human powered vehicle, because the electric component consecutively transmits only while the first control signal is transmitted while the at least one operating member is operated.

In accordance with a third aspect of the present invention, the electric component according to any one of the first and second aspects is configured so that the controller is configured to control the transmitter to stop transmitting the first control signal when the receiver wirelessly receives the acknowledgement signal.

With the electric component according to the third aspect, it is possible to prevent the transmitter from transmitting unnecessary wireless signals, because the transmitter is configured to stop transmitting the first control signal when the receiver wirelessly receives the acknowledgement signal.

In accordance with a fourth aspect of the present invention, the electric component according to any one of the first to third aspects is configured so that the controller is configured to control the transmitter to stop transmitting the first control signal when a second predetermined time period has passed since the time point. The second predetermined time period is equal to or smaller than the first predetermined time period.

With the electric component according to the fourth aspect, it is possible to further prevent the transmitter from transmitting unnecessary wireless signals, because the transmitter to stop transmitting the first control signal when a second predetermined time period has passed since the transmitter starts transmitting the first control signal.

In accordance with a fifth aspect of the present invention, the electric component according to any one of the first to fourth aspects is configured so that the controller is configured to control the transmitter to transmit the second control signal when the first predetermined time period has passed since the transmitter starts transmitting the first control signal.

With the electric component according to the fifth aspect, it is possible to further enhance operability of the human powered vehicle, because the electric component transmits the second control signal when the first predetermined time period has passed since the transmitter starts transmitting the first control signal.

In accordance with a sixth aspect of the present invention, the electric component according to any one of the first to fifth aspects is configured so that the controller is configured to control the transmitter to periodically transmit the wireless signals at intervals of a third predetermined time period until the receiver receives the acknowledgement signal. The third predetermined time period is smaller than the first predetermined time period.

With the electric component according to the sixth aspect, it is possible to further enhance operability of the human powered vehicle, because the electric component transmits the first control signal consecutively, and then transmit the second control signal when the at least one operating member is operated in a period more than or equal to the first predetermined time period.

In accordance with a seventh aspect of the present invention, the electric component according to the sixth aspect is configured so that the controller is configured to randomly change a length of the third predetermined time period.

With the electric component according to the seventh aspect, it is possible to reduce the possibility of collision of wireless signals.

In accordance with an eighth aspect of the present invention, the electric component according to according to any one of the first to seventh aspects further comprises a power storage to supply electric power to at least one of the controller, the transmitter, and the receiver.

With the electric component according to the eighth aspect, it is possible to enhance operability of the human powered vehicle.

In accordance with a ninth aspect of the present invention, the electric component according to the eighth aspect further comprises a power generator to generate the electric power in response to the operation of the at least one operating member. The power storage is configured to store the electric power generated by the power generator.

With the electric component according to the ninth aspect, it is possible to save energy, because physical energy generated due to the operation of the at least one operating member is converted to the electric power which is then stored in the power storage.

In accordance with a tenth aspect of the present invention, the electric component according to any one of the eighth and ninth aspects is configured so that the power generator is configured to generate the electric power in response to a movement of the at least one operating member between a first position and a second position different from the first position.

With the electric component according to the tenth aspect, it is possible to save energy, because physical energy generated due to the movement of the at least one operating member is converted to the electric power which is then stored in the power storage.

In accordance with an eleventh aspect of the present invention, a control system for a human powered vehicle comprises the electric component according to any one of the first to tenth aspects and the additional electric component.

With the control system according to the eleventh aspect, it is possible to enhance operability of the human powered vehicle, because the electric component consecutively transmits the first control signal until it receives the acknowledgement signal from the additional electric component.

In accordance with a twelfth aspect of the present invention, the control system according to the eleventh aspect is configured so that the additional electric component includes an additional receiver configured to wirelessly receive the wireless signals from the transmitter and an additional transmitter configured to wirelessly transmit the acknowledgement signal in response to at least one of the wireless signals.

With the control system according to the twelfth aspect, it is possible to enhance operability of the human powered vehicle, because the electric component consecutively transmits the first control signal until it receives the acknowledgement signal from the additional electric component.

In accordance with a thirteenth aspect of the present invention, the control system according to the twelfth aspect is configured so that the additional transmitter is configured to wirelessly retransmit the acknowledgement signal to the receiver if the additional receiver wirelessly receives from the transmitter a wireless signal in response to which the transmitter transmits the acknowledgement signal.

With the control system according to the thirteenth aspect, it is possible to enhance reliability of communication between the electric component and the additional electric component.

In accordance with a fourteenth aspect of the present invention, the control system according to the thirteenth aspect is configured so that the additional transmitter is configured to retransmit the acknowledgement signal to the receiver if the receiver wirelessly receives the wireless signal after a fourth predetermined time period has passed since the additional transmitter transmits the acknowledgement signal. The fourth predetermined time period is smaller than the first predetermined time period.

With the control system according to the fourteenth aspect, it is possible to further enhance reliability of communication between the electric component and the additional electric component.

In accordance with a fifteenth aspect of the present invention, the control system according to any one of the twelfth to fourteenth aspects is configured so that the additional electric component further includes a movable member and an actuator configured to actuate the movable member.

With the control system according to the fifteenth aspect, it is possible to enhance operativity of the human powered vehicle, because the actuator move the movable member.

In accordance with a sixteenth aspect of the present invention, the control system according to the fifteenth aspect is configured so that the additional electric component includes a shifting device having a plurality of speed stages.

With the control system according to the sixteenth aspect, it is possible to further enhance operativity of the human powered vehicle, because the additional electric component can change a speed stage.

In accordance with a seventeenth aspect of the present invention, the control system according to the sixteenth aspect is configured so that the movable member includes a chain guide of a derailleur.

With the control system according to the seventeenth aspect, it is possible to further enhance operativity of the human powered vehicle, because the derailleur can change a speed stage.

In accordance with an eighteenth aspect of the present invention, the control system according to any one of the sixteenth and seventeenth aspects is configured so that the additional electric component is configured to sequentially change the speed stage of the additional electric component such that a gear ratio of the shifting device increases upon receiving the first control signal and upon receiving the second control signal subsequent to the first control signal in response to a first operation of the at least one operating member. The additional electric component is configured to sequentially change the speed stage of the additional electric component such that a gear ratio of the shifting device decreases upon receiving the first control signal and upon receiving the second control signal subsequent to the first control signal in response to a second operation of the at least one operating member. The second operation is different from the first operation.

With the control system according to the eighteenth aspect, it is possible to further enhance usability of the human powered vehicle, because multiple gear changes can be performed by a user's continuous single operation.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
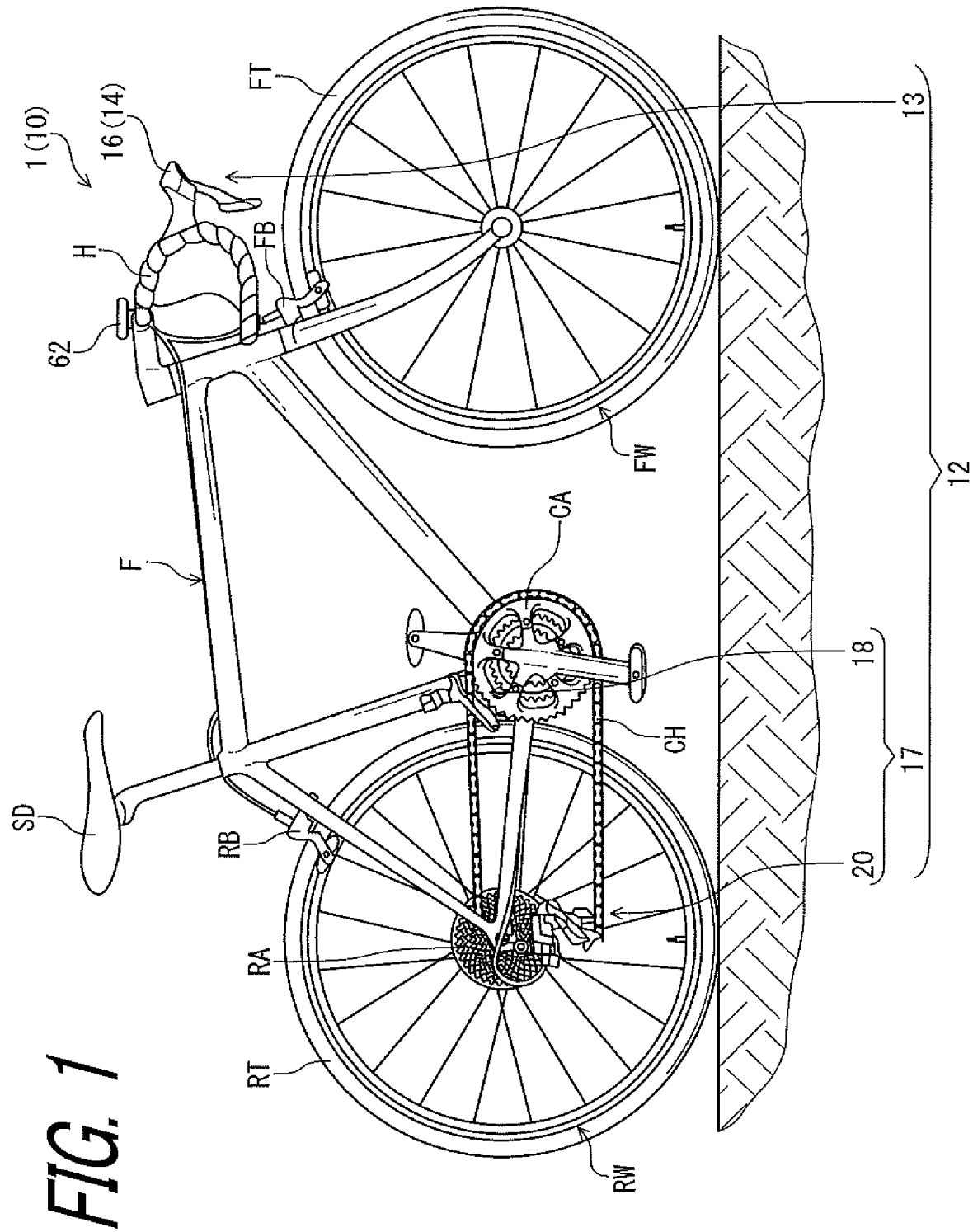
FIG. 1 is a side elevational view of a bicycle that includes a control system mounted to the handlebar of the bicycle in accordance with a first embodiment.

The embodiments will now be described with reference to the accompanying drawings, wherein like reference numerals designate corresponding or identical elements throughout the various drawings.

First Embodiment

Referring initially to FIG. 1, a bicycle 10 as an example of a human powered vehicle 1 includes a control system 12 in accordance with a first embodiment. The human powered vehicle 1 is a vehicle to travel with a motive power including at least a human power of a rider who rides the human powered vehicle 1. The human powered vehicle 1 has an arbitrary number of wheels. For example, the human powered vehicle 1 has either one, two, three, four, or more than five wheels. In this embodiment, the human powered vehicle 1 has a smaller size than that of a four-wheeled automobile, but the human powered vehicle 1 can have an arbitrary size. For example, the human powered vehicle 1 can be larger than the four-wheeled automobile. The human powered vehicles 1 include the bicycle 10, a tricycle, and a kick scooter. While the bicycle 10 is illustrated as a mountain bike, the control system 12 can be applied to a road bike or any type of bicycle.

The control system 12 is an electrically powered system. In the illustrated embodiment, the control system 12 basically includes a first (front) operating device 14, a second (rear) operating device 16, a first (front) bicycle electric shifting device 18 and a second (rear) bicycle electric shifting device 20. The first (front) operating device 14 and the second (rear) operating device 16 can be collectively referred to as an electric component 13. The first (front) bicycle electric shifting device 18 and the second (rear) bicycle electric shifting device 20 can be collectively referred to as an additional electric component 17. In this embodiment, the control system 12 is a bicycle electric shifting apparatus. However, the control system 12 is not limited to this particular arrangement. The control system 12 can be used with other systems and/or components of the bicycle 10, such as adjustable seatposts, adjustable suspensions, auxiliary drive units, etc.

Basically, the control system 12 for the human powered vehicle 1 comprises the electric component 13 and the additional electric component 17. The electric component 13 and the additional electric component 17 are configured to wirelessly communicate. The first and second operating devices 14 and 16 are each an example of the electric component 13 of the control system 12. While the control system 12 includes two of the electric components 13, it will be apparent to those skilled in the bicycle field from this disclosure that the control system 12 can have only one electric component 13, or more than two of the electric components 13 as need and/or desired. In the illustrated embodiment, the first and second operating devices 14 and 16 are shifters that include a braking function. The first and second bicycle electric shifting devices 18 and 20 are each an example of the additional electric component 17 of the control system 12. Accordingly, the additional electric component 17 includes a shifting device 18, 20 having a plurality of speed changes. Specifically, the first and second bicycle electric shifting devices 18 and 20 are bicycle derailleurs. More specifically, the first bicycle electric shifting device 18 is a front bicycle derailleur, while the second bicycle electric shifting device 20 is a rear bicycle derailleur. While the control system 12 includes two of the additional electric components 17, it will be apparent to those skilled in the bicycle field from this disclosure that the control system 12 can have only one additional electric component 17, or more than two of the additional electric components 17 as need and/or desired.

Referring to FIG. 1, the bicycle 10 includes, among other things, a bicycle frame F with a saddle SD, a handlebar H, a front wheel FW, a rear wheel RW, a front brake FB and a rear brake RB. Referring again to FIG. 1, the front wheel FW is mounted in a conventional manner to a steering fork attached to the bicycle frame F below the handlebar H. A front tire FT is attached to the front wheel FW. The rear wheel RW includes a rear sprocket assembly RA. The rear sprocket assembly RA includes a plurality of rear sprockets. The rear wheel RW is mounted in a conventional manner to a rear portion of the bicycle frame F. A rear tire RT is attached to the rear wheel RW. A crank assembly CA, as shown in FIG. 1, is rotatably supported to a lower portion of the bicycle frame F in a conventional manner. The crank assembly CA includes a set of front sprockets mounted to the crank axle in a conventional manner. A chain CH is operatively coupled between a front sprocket and a rear sprocket in a conventional manner. Since the front wheel FW, the rear wheel RW, the front brake FB, the rear brake RB, the rear sprocket assembly RA and the crank assembly CA are all conventional elements, no further description is provided for the sake of brevity.

In the present application, the following directional terms "front," "rear," "forward," "rearward," "left," "right," "transverse," "upward" and "downward" as well as any other similar directional terms refer to those directions which are determined on the basis of a user (e.g., a rider) who sits on the saddle SD with facing the handlebar H. Accordingly, these terms, as utilized to describe the control system 12 and electric component 13, should be interpreted relative to the bicycle 10 equipped with the control system 12 as used in an upright riding position on a horizontal surface.

Figure 2:
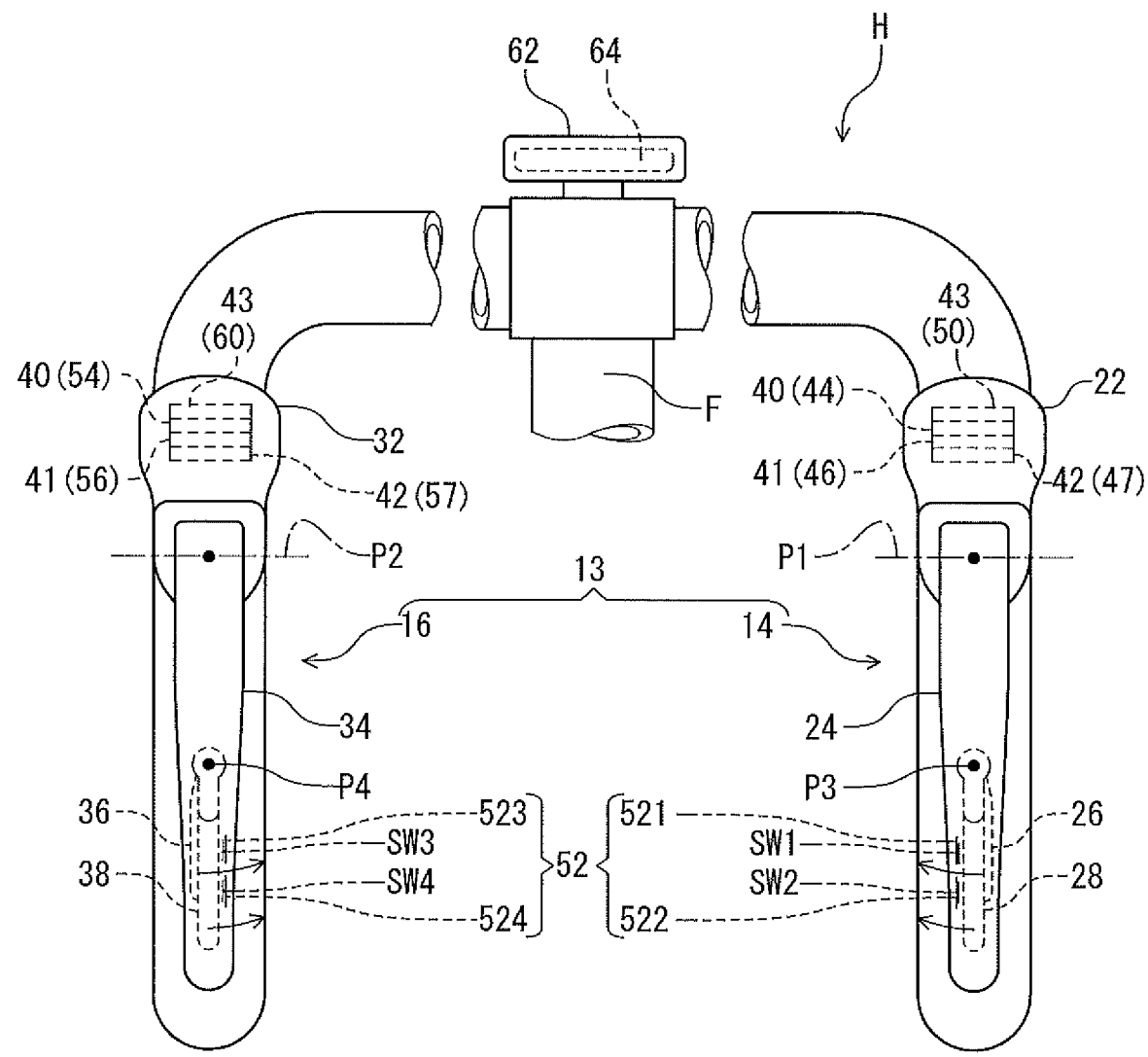
FIG. 2 is a front elevational view of a bicycle handlebar area of the bicycle illustrated in FIG. 1.
Figure 3:
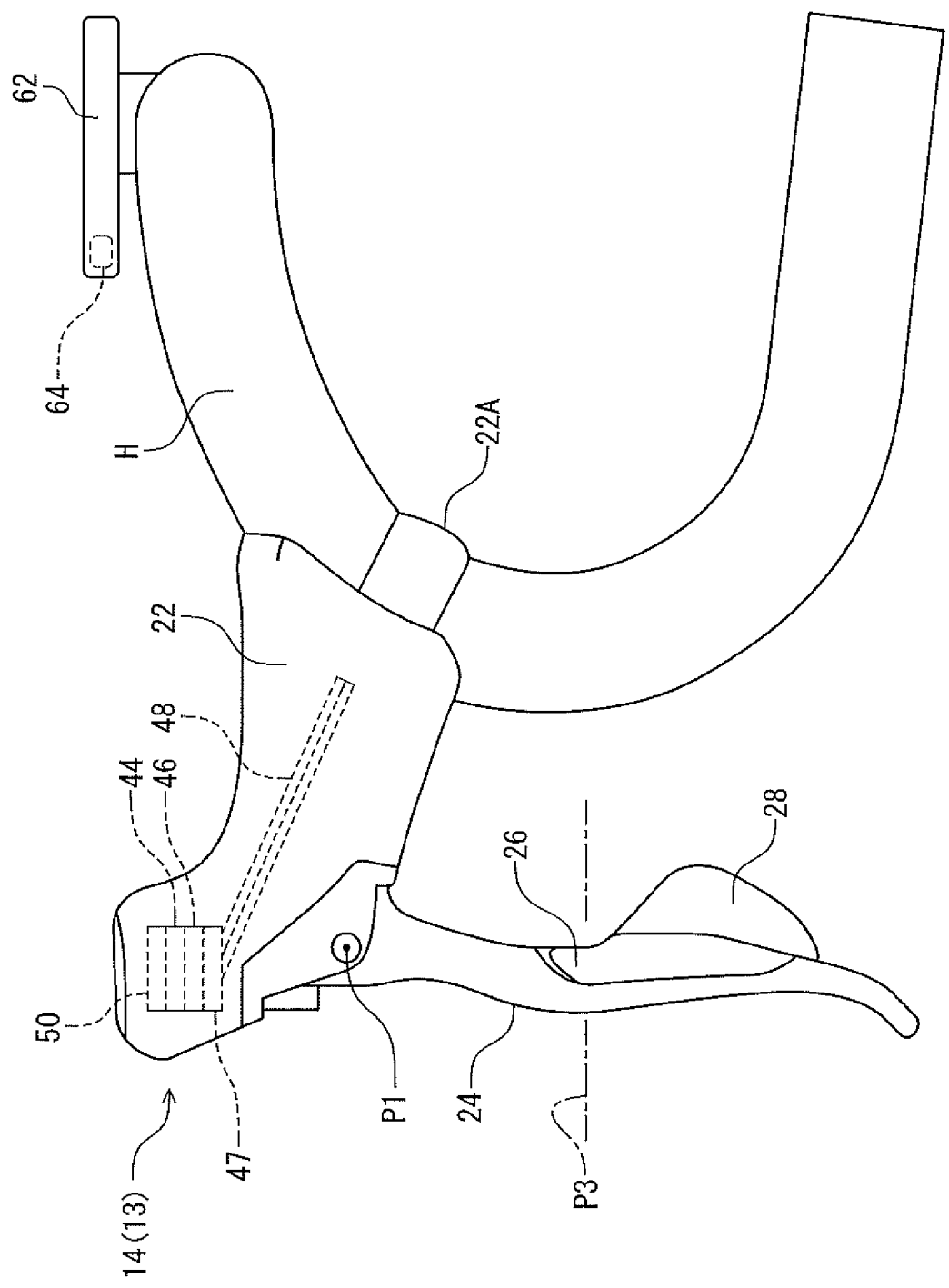
FIG. 3 is a side elevational view of the handlebar and the left or first operating device (front shifter) showing a left outboard side of the bicycle illustrated in FIG. 1.
Figure 4:
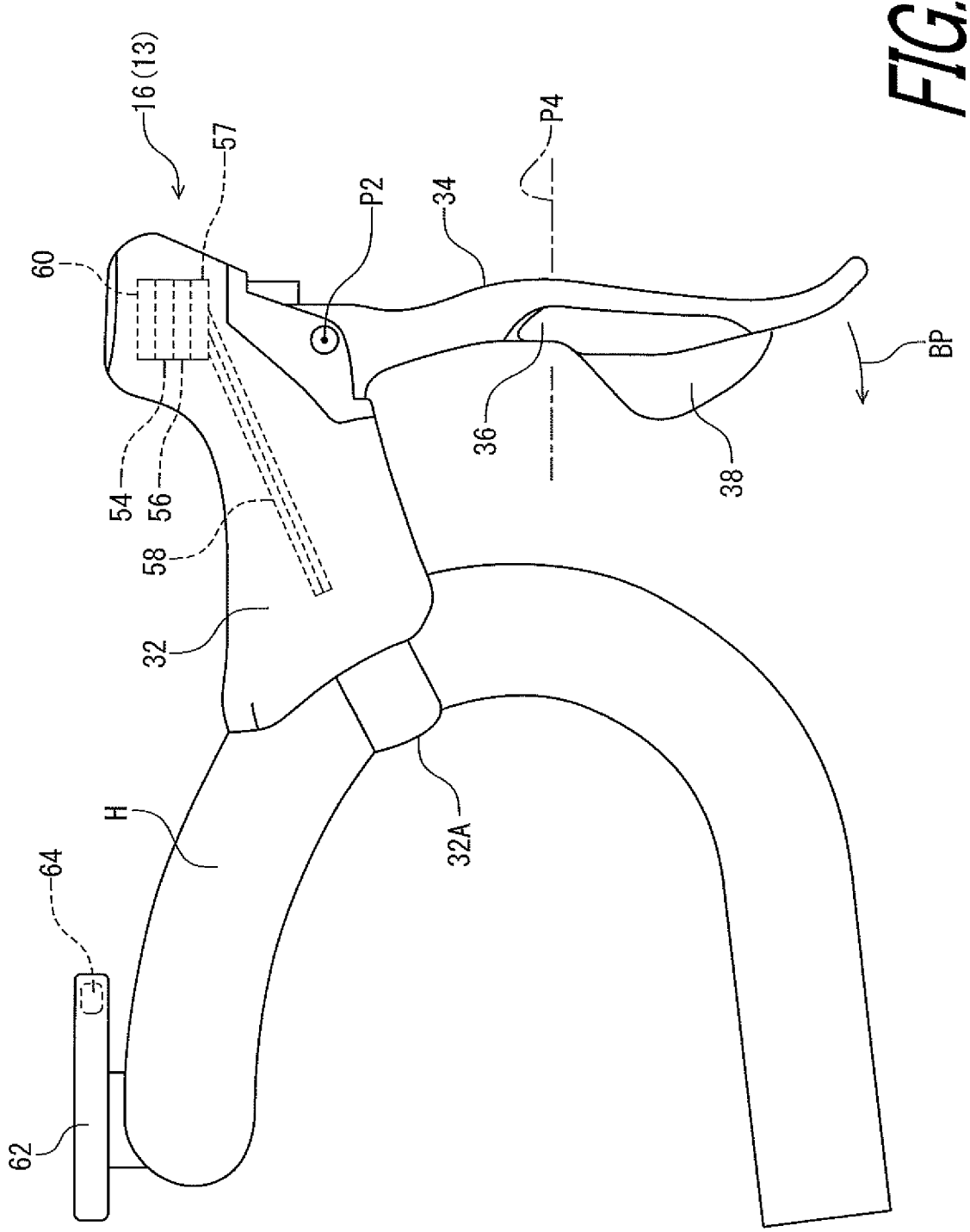
FIG. 4 is a side elevational view of the handlebar and the right or second operating device (rear shifter) showing a right outboard side of the bicycle illustrated in FIG. 1.

Referring now to FIGS. 2 to 4, the first and second operating devices 14 and 16 will now be discussed. In the first illustrated embodiment, the first operating device 14 (i.e., left hand shift/brake control device) controls the first bicycle electric shifting device 18 and the front brake FB. Basically, the first operating device 14 includes a bracket 22, a brake operating member 24, a first operating member 26 and a second operating member 28. The second operating device 16 (i.e., right hand shift/brake control device) controls the second bicycle electric shifting device 20 and the rear brake RB. Basically, the second operating device 16 includes a bracket 32, a brake operating member 34, a first operating member 36 and a second operating member 38. It will be apparent to those skilled in the bicycle field from this disclosure that the first and second operating devices 14 and 16 are not limited to this configuration. Thus, each of the first and second operating devices 14 and 16 constitutes the electric component 13 for the human powered vehicle 1 comprising at least one operating member (at least one of 26, 28, 36, and 38).

The brackets 22 and 32 are preferably made of a lightweight material such as composite materials, plastic, polymers or light weight metals such as aluminum or titanium. The first operating device 14 includes a first attachment member 22A to attach the bracket 22 to a left portion of the handlebar H in a conventional manner. The second operating device 16 includes a second attachment member 32A to attach the bracket 32 to a right portion of the handlebar H in a conventional manner. Here, the brake operating member 24 is a brake lever that is pivotally mounted to the bracket 22 about a pivot axis P1, while the brake operating member 34 is a brake lever that is pivotally mounted to the bracket 32 about a pivot axis P2. Of course, the first and second operating devices 14 and 16 are not limited to being mounted on the handlebar H. The first and second operating devices 14 and 16 can be positioned anywhere within reach of the user.

As see in FIG. 2, the first and second operating members 26 and 28 are pivotally mounted to the brake operating member 24 about a pivot axis P3. The first operating member 26 is configured to operate a switch SW1 as the first operating member 26 pivots about the pivot axis P3 from a rest position (FIG. 2) to an operated position. The second operating member 28 is configured to operate a switch SW2 as the first operating member 26 pivots about the pivot axis P3 from a rest position (FIG. 2) to an operated position. The first and second operating members 26 and 28 are trigger levers that are biased to their rest positions such that they each automatically return to their rest positions upon being released from an operated position. The term "rest position" as used herein refers to a state in which a movable part (e.g., the first and second operating members 26 and 28) remains stationary without the need of a user intervening (e.g., holding the movable part) to establish a state corresponding to the rest position. Thus, the term "rest position" can also be referred to as a non-operated position. The switches SW1 and SW2 can be any type of switches. For example, the switches SW1 and SW2 can include any type of toggle switch, pressure switch, contactless switch or any other suitable type of switch that provides a control signal in response to shifting movement of the first and second operating members 26 and 28 about the pivot axis P3 to effect upshifting and downshifting, respectively.

The first and second operating members 36 and 38 are pivotally mounted to the brake operating member 34 about a pivot axis P4. The first operating member 36 is configured to operate a switch SW3 as the first operating member 36 pivots about the pivot axis P4 from a rest position (FIG. 2) to an operated position. The second operating member 38 is configured to operate a switch SW4 as the first operating member 26 pivots about the pivot axis P4 from a rest position (FIG. 2) to an operated position. The first and second operating members 36 and 38 are trigger levers that are biased to their rest positions such that they each automatically return to their rest positions upon being released from an operated position. The switches SW3 and SW4 can be any type of switches. For example, the switches SW3 and SW4 can include any type of toggle switch, pressure switch, contactless switch or any other suitable type of switch that provides an output signal in response to shifting movement of the first and second operating members 36 and 38 about the pivot axis P4 to effect upshifting and downshifting, respectively.

In the illustrated embodiment, the electric component 13 comprises a controller 40, a transmitter 41, and a receiver 42. More specifically, the first operating device 14 includes a first controller 44, a first wireless transmitter 46, and a first wireless receiver 47. The second operating device 16 further includes a second controller 54, a second wireless transmitter 56, and a second wireless receiver 57. The first controller 44 and the second controller 54 can be collectively referred to as the controller 40. The first wireless transmitter 46 and the second wireless transmitter 56 can be collectively referred to as the transmitter 41. The first wireless receiver 47 and the second wireless receiver 57 can be collectively referred to as the receiver 42. The transmitter 41 and the receiver 42 can be separate devices or integrated into a single device. More specifically, the first wireless transmitter 46 and the first wireless receiver 47 can be separate devices or integrated into a single device. The second wireless transmitter 56 and the second wireless receiver 57 can be separate devices or integrated into a single device.

The first controller 44 is electrically connected to the switches SW1 and SW2 by electrical wires (not shown). The first controller 44 is also electrically connected to the first wireless transmitter 46 and the first wireless receiver 47. For example, the first controller 44, the first wireless transmitter 46, and the first wireless receiver 47 can be provided on a printed circuit board that is mounted to the bracket 22. In the illustrated embodiment, the first operating device 14 further includes a first antenna 48 that is electrically connected to the first wireless transmitter 46 to transmit wireless signals indicative of the operation of the switches SW1 and SW2 by the first and second operating members 26 and 28. In other words, the transmitter 41 is configured to wirelessly transmit wireless signals to the additional electric component 17 for the human powered vehicle 1. The first antenna 48 is also electrically connected to the first wireless receiver 47 to receive wireless signals from the first bicycle electric shifting device 18 and the second bicycle electric shifting device 20.

The electric component 13 further comprises a power storage 43 to supply electric power to at least one of the controller 40, the transmitter 41, and the receiver 42. Specifically, the first operating device 14 further includes a first power source 50 as the power storage 43. In the illustrated embodiment, the first power source 50 can be provided on the printed circuit board for the first controller 44, the first wireless transmitter 46, and the first wireless receiver 47 to provide electric power to at least one of the first controller 44, the first wireless transmitter 46, and the first wireless receiver 47. However, the first power source 50 may not be provided on the printed board and can be electrically connected to the first controller 44, the first wireless transmitter 46, and the first wireless receiver 47 by an electrical wire (not shown) to provide electric power to at least one of the first controller 44, the first wireless transmitter 46, and the first wireless receiver 47.

Similarly, in the illustrated embodiment, as seen in FIG. 2, the second operating device 16 further includes the second controller 54 and the second wireless transmitter 56, and the second wireless receiver 57. The second controller 54 is electrically connected to the switches SW3 and SW4 by electrical wires (not shown). The second controller 54 is also electrically connected to the second wireless transmitter 56 and the second wireless receiver 57. For example, the second controller 54, the second wireless transmitter 56, and the second wireless receiver 57 can be provided on a printed circuit board that is mounted to the bracket 32. In the illustrated embodiment, the second operating device 16 further includes a second antenna 58 that is electrically connected to the second wireless transmitter 56 for transmitting signals indicative of the operation of the switches SW3 and SW4 by the first and second operating members 36 and 38. In other words, the transmitter 41 is configured to wirelessly transmit wireless signals to the additional electric component 17 for the human powered vehicle 1. The second antenna 58 is also electrically connected to the second wireless receiver 57 to receive wireless signals from the first bicycle electric shifting device 18 and the second bicycle electric shifting device 20, The second operating device 16 further includes a second power source 60 as the power storage 43. In the illustrated embodiment, the second power source 60 can be provided on the printed circuit board for the second controller 54, the second wireless transmitter 56, and the second wireless receiver 57 to provide electric power to at least one of the second controller 54, the second wireless transmitter 56, and the second wireless receiver 57. However, the second power source 60 may not be provided on the printed board and can be electrically connected to the second controller 54, the second wireless transmitter 56, and the second wireless receiver 57 by an electrical wire (not shown) to provide electric power to at least one of the second controller 54, the second wireless transmitter 56, and the second wireless receiver 57.

Each of the first and second controllers 44 and 54 is preferably a micro-computer that includes conventional components such as includes a central processing unit (CPU), an input interface circuit, an output interface circuit, and storage devices such as a ROM (Read Only Memory), a RAM (Random Access Memory), and/or a FLASH memory. The first controller 44 is programmed to process signals from the switches SW1 and SW2 as upshifting signals and downshifting signals, respectively, for shifting the first bicycle electric shifting device 18. The second controller 54 is programmed to process signals from the switches SW3 and SW4 as upshifting signals and downshifting signals, respectively, for shifting the second bicycle electric shifting device 20.

The first wireless transmitter 46 reads or otherwise receives operation signals from the first controller 44, and transmits wireless control signals indicative of the operation of the SW1 and/or SW2 by the first operating member 26 and/or the second operating member 28. Similarly, the second wireless transmitter 56 reads or otherwise receives operation signals from the second controller 54, and transmits wireless control signals indicative of the operation of the SW3 and/or SW4 by the first operating member 36 and/or the second operating member 38. The wireless control signals can be radio frequency (RF) signals or any other type of signal suitable for wireless communications as understood in the bicycle field. It should also be understood that the first and second wireless transmitters 46 and 56 can transmit the signals at a particular frequency and/or with an identifier such as a particular code, to distinguish the wireless control signal from other wireless control signals. In this way, the first bicycle electric shifting device 18 can recognize which control signals are upshifting signals for the first bicycle electric shifting device 18 and which control signals are downshifting signals for the first bicycle electric shifting device 18. Likewise, the second bicycle electric shifting device 20 can recognize which control signals are upshifting signals for the second bicycle electric shifting device 20 and which control signals are downshifting signals for the second bicycle electric shifting device 20. Thus, first bicycle electric shifting device 18 ignores the control signals for the second bicycle electric shifting device 20, and the second bicycle electric shifting device 20 ignores the control signals for the first bicycle electric shifting device 18.

Further, the electric component 13 comprises a power generator 52 to generate the electric power in response to the operation of the at least one operating member (at least one of 26, 28, 36, and 38). More specifically, as seen in FIG. 2, the first operating device 14 includes at least one of a first power generator 521 and a second power generator 522. The first power generator 521 is, for example, a piezoelectric element that is configured to generate the electric power by a pressure due to the operation of the switch SW1. The second power generator 522 is, for example, a piezoelectric element that is configured to generate the electric power by a pressure due to the operation of the switch SW2. The second operating device 16 includes at least one of a third power generator 523 and a fourth power generator 524. The third power generator 523 is, for example, a piezoelectric element that is configured to generate the electric power by a pressure due to the operation of the switch SW3. The fourth power generator 524 is, for example, a piezoelectric element that is configured to generate the electric power by a pressure due to the operation of the switch SW4. The first power generator 521, the second power generator 522, the third power generator 523 and the fourth power generator 524 can be collectively referred to as the power generator 52.

The power generator 52 is configured to generate the electric power in response to a movement of the at least one operating member (at least one of 26, 28, 36, and 38) between a first position and a second position different from the first position. More specifically, the first power generator 521 is configured to generate the electric power in response to a movement of the first operating member 26 between its rest position and its operated position. The second power generator 522 is configured to generate the electric power in response to a movement of the second operating member 28 between its rest position and its operated position. The third power generator 523 is configured to generate the electric power in response to a movement of the first operating member 36 between its rest position and its operated position. The fourth power generator 524 is configured to generate the electric power in response to a movement of the second operating member 38 between its rest position and its operated position. The first position can be one of the rest position of the at least one operating member (at least one of 26, 28, 36, and 38). The second position can be another of the rest position of the at least one operating member (at least one of 26, 28, 36, and 38). In the above explanation, each of the first power generator 521, the second power generator 522, the third power generator 523 and the fourth power generator 524 is a piezoelectric element. However, each of them can be a different power generator from a piezoelectric element. For example, the at least one operating member (at least one of 26, 28, 36, and 38) can have a magnet and at least one of the first power generator 521, the second power generator 522, the third power generator 523 and the fourth power generator 524 includes a coil to generate the electric power via electromagnetic induction due to a movement of the at least one operating member (at least one of 26, 28, 36, and 38) between the first position and the second position.

The power storage 43 (specifically, at least one of the first power source 50 and the second power source 60) can include a hydrogen powered fuel cell, a rechargeable battery, or a capacitor that is electrically connected to the power generator 52. Accordingly, the power storage 43 is configured to store the electric power generated by the power generator 52.

As seen in FIGS. 2 to 4, in the illustrated embodiment, the control system 12 further includes a cyclocomputer or operation device 62 that is mounted to a central portion of the handlebar H in a conventional manner. The operation device 62 preferably includes a micro-computer having conventional components such as a central processing unit (CPU), an input interface circuit, an output interface circuit, and storage devices such as a ROM (Read Only Memory), a RAM (Random Access Memory), and/or a FLASH memory. In the illustrated embodiment, the operation device 62 includes a wireless receiver 64, which can receive information from the first and second wireless transmitters 46 and 56 of the first and second operating devices 14 and 16, respectively. Alternatively, the operation device 62 can be electrically coupled to the first and second operating devices 14 and 16 via wires or other suitable connections.

Figure 5:
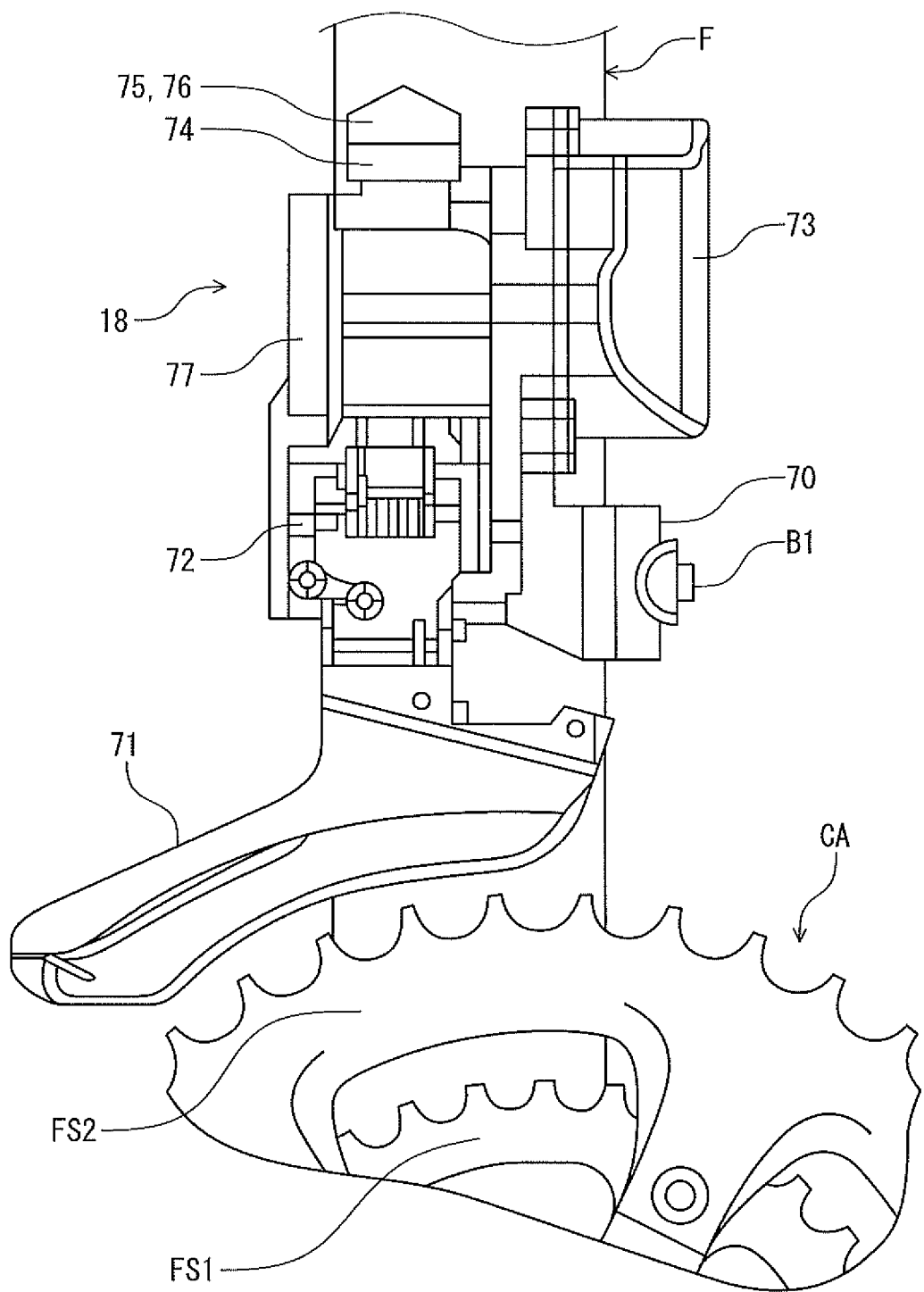
FIG. 5 is a side elevational view of the front bicycle derailleur as one of the bicycle electric shifting devices of the bicycle illustrated in FIG. 1.
Figure 6:
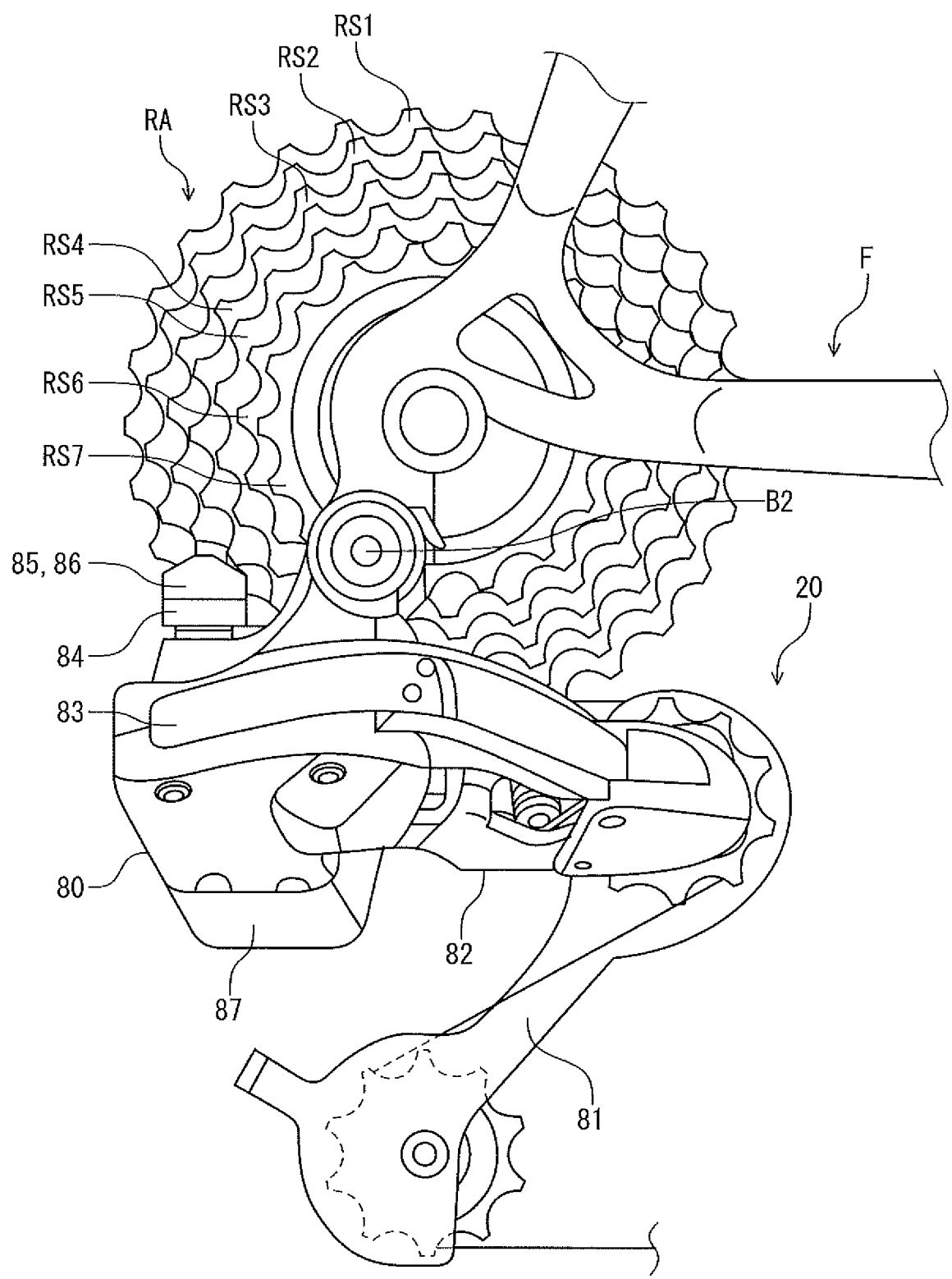
FIG. 6 is a side elevational view of the rear bicycle derailleur as one of the bicycle electric shifting devices of the bicycle illustrated in FIG. 1.
Figure 7:
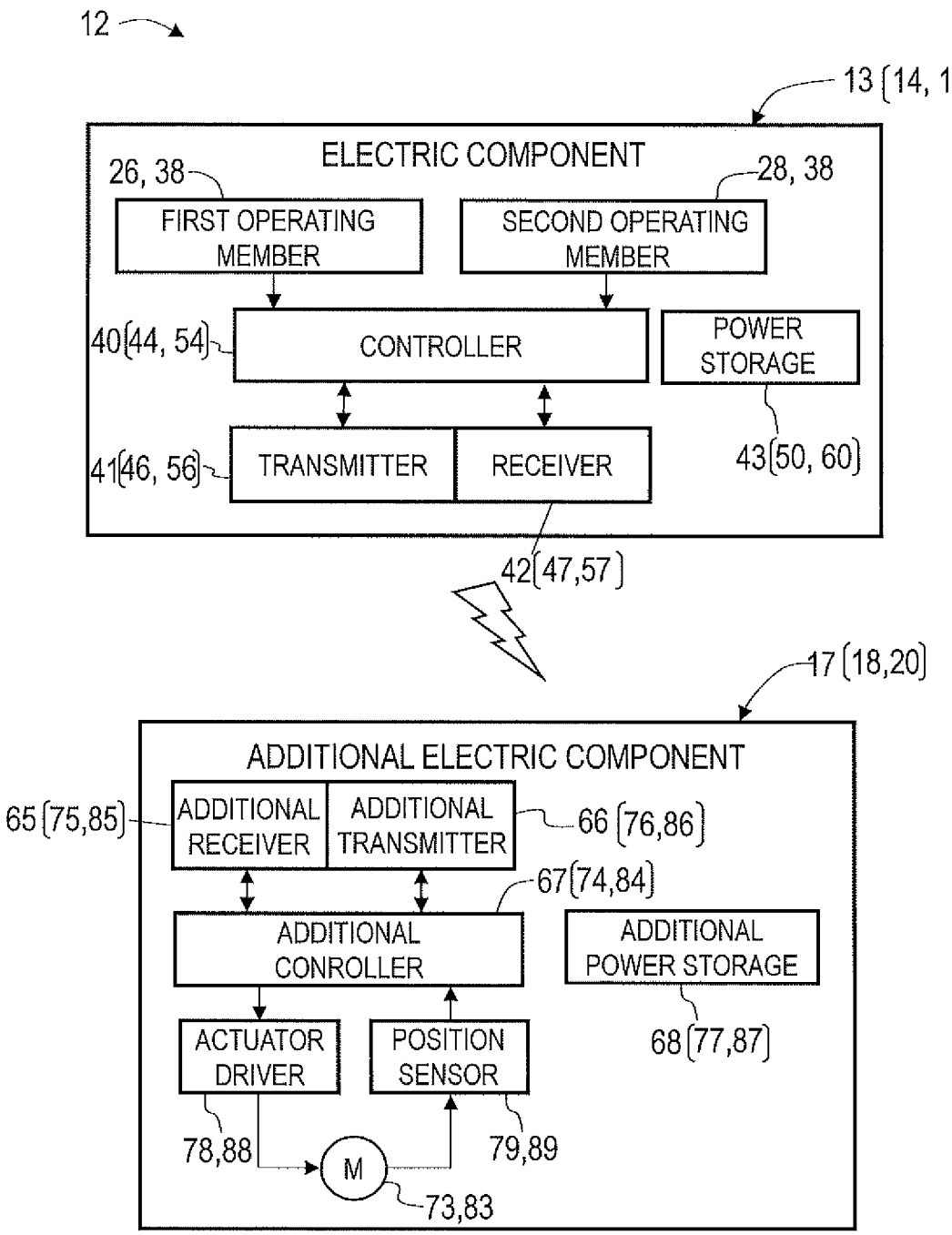
FIG. 7 is a simplified schematic block diagram of an example of the control system having the electric component and the additional electric component (e.g., one of the rear and front derailleurs) of the bicycle shown in FIG. 1.

Referring now to FIGS. 5 to 7, the first and second bicycle electric shifting devices 18 and 20 (the additional electric components 17) will now be discussed. As mentioned above, the first and second bicycle electric shifting devices 18 and 20 are bicycle derailleurs. However, it will be apparent to those skilled in the bicycle field from this disclosure that the bicycle electric shifting devices are not limited to bicycle derailleurs. For example, the rear bicycle electric shifting device can be an internally geared hub as explained in a modification of the embodiment (See FIG. 17).

As seen in FIG. 7, the additional electric component 17 includes an additional receiver 65 and an additional transmitter 66. More specifically, as seen in FIGS. 5 and 7, the first bicycle electric shifting device 18 includes a first additional wireless receiver 75 and a first additional wireless transmitter 76. As seen in FIGS. 6 and 7, the second bicycle electric shifting device 20 includes a second additional wireless receiver 85 and a second additional wireless transmitter 86. The first additional wireless transmitter 76 and the second additional wireless transmitter 86 can be collectively referred to as the additional transmitter 66. Further, as seen in FIG. 7, the additional electric component 17 can further include an additional controller 67. More specifically, as seen in FIGS. 5 and 7, the first bicycle electric shifting device 18 can further include a first additional controller 74. As seen in FIGS. 6 and 7, the second bicycle electric shifting device 20 can further include a second additional controller 84. The first additional controller 74 and the second additional controller 84 can be collectively referred to as the additional controller 67. The first additional wireless receiver 75, the first additional wireless transmitter 76, and the first additional controller 74 are connected to each other and, for example, can be provided on a printed circuit board. The second additional wireless receiver 85, the second additional wireless transmitter 86, and the second additional controller 84 are connected to each other and, for example, can be provided on a printed circuit board.

As seen in FIG. 5, the first bicycle electric shifting device 18 is a bicycle front derailleur that has a base member 70, a chain guide 71 and a linkage 72. The base member 70 is configured to be attached to the bicycle 10. In particular, the base member 70 is attached to the bicycle frame F adjacent to the crank assembly CA by a bolt B1. The chain guide 71 is movably supported relative to the base member 70. Specifically, in the illustrated embodiment, the linkage 72 movably supports the chain guide 71 relative to the base member 70. Here, the linkage 72 includes two links that are pivotally connected between the base member 70 and the chain guide 71 to form a four-bar linkage. In the following description, the chain guide 71 can also be referred to as a movable member 71.

The chain guide 71 is configured to move the chain CH between the front sprockets FS1 and FS2 of the crank assembly CA in response to the operation of the first operating device 14 of the control system 12. Each of the front sprockets FS1 and FS2 defines a speed stage of the first bicycle electric shifting device 18. The speed stages include a first speed stage corresponding to the front sprocket FS1 and a second speed stage corresponding to the front sprocket FS2. A total number of teeth of the front sprocket FS1 is smaller than a total number of teeth of the front sprocket FS2, thereby a gear ratio of the first speed stage is smaller than a gear ratio of the second speed stage. In this embodiment, the gear ratio is defined as a total number of teeth of a front sprocket FS1 or FS2 with which the chain CH engages divided by a total number of teeth of a rear sprocket with which the chain CH engages. The first bicycle electric shifting device 18 further includes an actuator 73 that is mechanically connected to the linkage 72. Operation of the actuator 73 moves the linkage 72, which in turn moves the chain guide 71 relative to the base member 70. Accordingly, the additional electric component 17 further includes the movable member 71 and the actuator 73 configured to move the movable member 71. The movable member 71 includes the chain guide 71 of a derailleur. The actuator 73 is operated based on wireless control signals from the first operating device 14. Here, the actuator 73 is a reversible electric motor.

As seen in FIG. 7, the additional electric component 17 further includes an additional power storage 68 to supply electric power to the additional receiver 65, the additional transmitter 66, and the additional controller 67. More specifically, as seen in FIGS. 5 and 7, the first bicycle electric shifting device 18 (the additional electric component 17) further includes a third power source 77 as the additional power storage 68 to supply the electrical power to the electrical parts of the first bicycle electric shifting device 18. The third power source 77 can include a hydrogen powered fuel cell or a rechargeable battery. The third power source 77 can be provided on the printed circuit board for the first additional wireless receiver 75, the first additional wireless transmitter 76, and the first additional controller 74. However, the third power source 77 can be a remotely located external power source. The first bicycle electric shifting device 18 further includes an actuator driver 78 and a position sensor 79 for controlling the actuator 73 to accurately position the chain guide 71 with respect to the chainrings of the chainring assembly (not shown).

Figure 9:
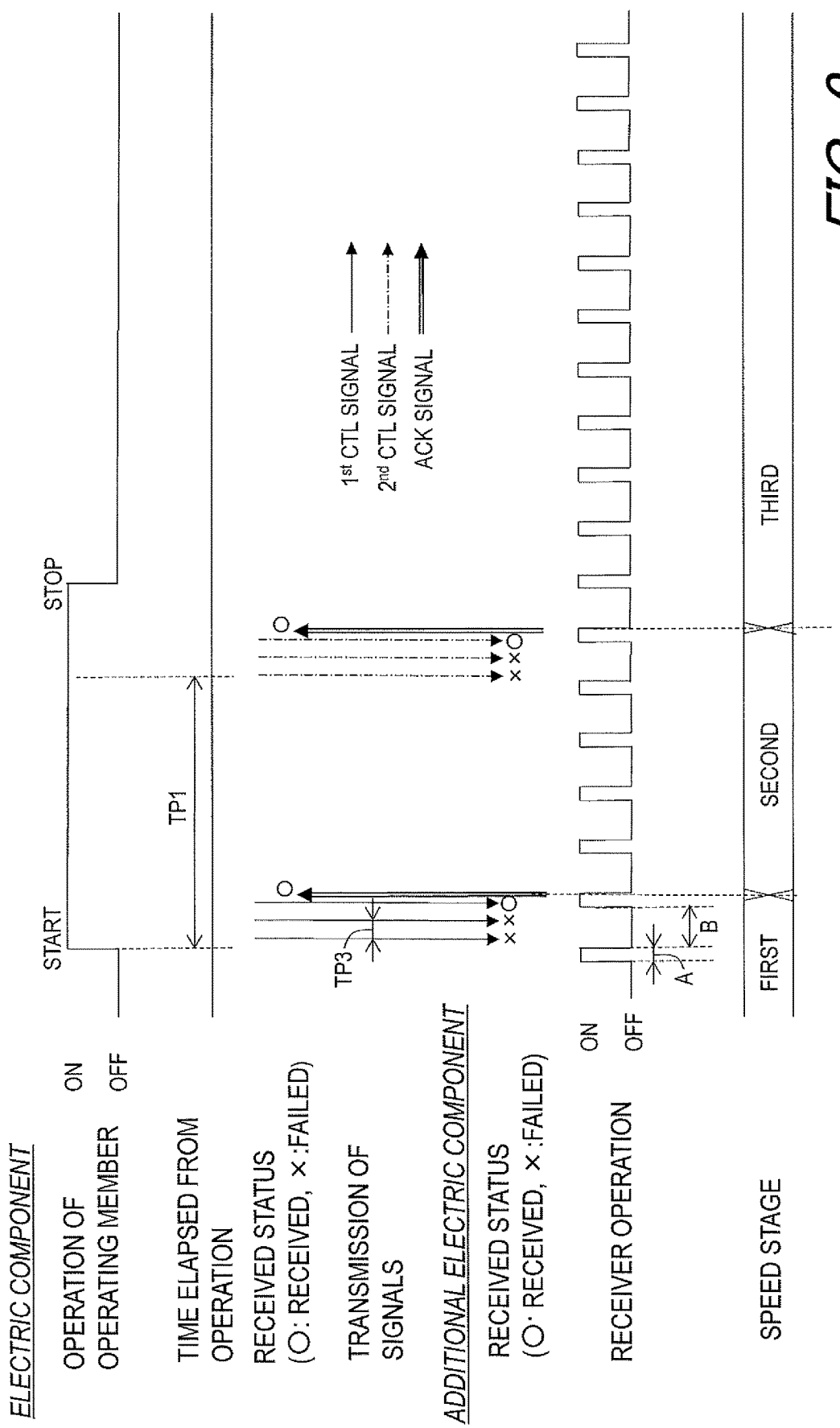
FIG. 9 is one communication timing diagram illustrating exemplary communications in which the controller executes the control process of FIG. 8.

In order to receive and process the wireless control signals from the first operating device 14, the first additional wireless receiver 75 is configured to wirelessly receive the control signals from the first wireless transmitter 46. That is, the additional receiver 65 is configured to wirelessly receive the wireless signals from the transmitter 41. As seen in FIG. 9, the first additional controller 74 is programed to periodically operate the first additional wireless receiver 75 for a predetermined listening period A to receive the control signals from the first wireless transmitter 46, as explained below. The first additional controller 74 is programed to periodically suspend an operation of the first additional wireless receiver 75 for a predetermined non-listening period B after the predetermined listening period A passes.

The first additional controller 74 is programmed to determine whether each of the wireless signals received by the first additional wireless receiver 75 is the wireless control signal based on the particular frequency of the control signal and/or an identifier included in the control signal. When the first additional controller 74 determines that at least one of the wireless signals received by the first additional wireless receiver 75 is the control signal, the first additional wireless transmitter 76 is configured to transmit an acknowledgement signal (an ACK signal) in response to the at least one of the wireless signals. In other words, when the additional controller 67 determines that at least one of the wireless signals received by the additional receiver 65 is the control signal, the additional transmitter 66 is configured to transmit an acknowledgement signal in response to the at least one of the wireless signals. More specifically, when the first additional controller 74 determines that at least one of the wireless signals that the first additional wireless receiver 75 receives in one predetermined listening period A, the first additional wireless transmitter 76 is configured to transmit the acknowledgement signal in response to the at least one of the wireless signals. Further, the first additional controller 74 is programmed to operate the actuator 73 based on at least one of the control signals being received by the first additional wireless receiver 75.

In the first operating device 14, the first wireless receiver 47 is configured to wirelessly receive the acknowledgement signal from the first bicycle electric shifting device 18. In other words, the receiver 42 is configured to wirelessly receive the acknowledgement signal from the additional electric component 17.

The first additional controller 74 is preferably a microcomputer that includes conventional components such as includes a central processing unit (CPU), an input interface circuit, an output interface circuit, and storage devices such as a ROM (Read Only Memory), a RAM (Random Access Memory), and/or a FLASH memory. The first additional controller 74 is programmed to process the wireless control signals received from the first additional wireless receiver 75 and to control the operation of the actuator 73 using the actuator driver 78 and the position sensor 79. As explained below, the first additional controller 74 is also programmed to control the operation of the first additional wireless receiver 75 in such a manner to reduce the power consumption of the third power source 77.

As seen in FIG. 6, the second bicycle electric shifting device 20 is a bicycle rear derailleur that has a base member 80, a chain guide 81 and a linkage 82. The base member 80 is configured to be attached to the bicycle 10. In particular, the base member 80 is attached to the bicycle frame F adjacent to the rear sprocket assembly RA by a bolt B2. The chain guide 81 is movably supported relative to the base member 80. Specifically, in the illustrated embodiment, the linkage 82 movably supports the chain guide 81 relative to the base member 80. Here, the linkage 82 includes two links that are pivotally connected between the base member 80 and the chain guide 81 to form a four-bar linkage. In the following description, the chain guide 81 can also be referred to as a movable member 81.

The chain guide 81 is configured to move the chain CH between the rear sprockets (two of RS1 to RS7) of the rear sprocket assembly RA in response to the operation of the second operating device 16 of the control system 12. Each of the rear sprockets RS1 to RS7 defines a speed stage of the second bicycle electric shifting device 20. The speed stages include a first speed stage, a second speed stage, a third speed stage, a fourth speed stage, a fifth speed stage, a sixth speed stage, and a seventh speed stage corresponding to the rear sprocket RS1, RS2, RS3, RS4, RS5, RS6, RS7, respectively. The rear sprocket RS1 is the largest rear sprocket among the rear sprockets RS1 to RS7. The rear sprocket RS7 is the smallest rear sprocket among the rear sprockets RS1 to RS7. As shown in FIG. 6, as a diameter of a rear sprocket decreases, a total number of teeth of the rear sprocket decreases. Accordingly, as an ordinal number of the speed stage increases, the gear ratio increases. The second bicycle electric shifting device 20 further includes an actuator 83 that is mechanically connected to the linkage 82. Operation of the actuator 83 moves the linkage 82, which in turn moves the chain guide 81 relative to the base member 80. Accordingly, the additional electric component 17 further includes the movable member 81 and the actuator 83 configured to move the movable member 81. The movable member 81 includes the chain guide 81 of a derailleur. The actuator 83 is operated based on wireless control signals from the second operating device 16. Here, the actuator 83 is a reversible electric motor.

As seen in FIGS. 6 and 7, the second bicycle electric shifting device 20 (the additional electric component 17) further includes a fourth power source 87 as the additional power storage 68 to supply the electrical power to the electrical parts of the second bicycle electric shifting device 20. The fourth power source 87 can include a hydrogen powered fuel cell or a rechargeable battery. The fourth power source 87 can be provided on the printed circuit board for the second additional wireless receiver 85, the second additional wireless transmitter 86, and the second additional controller 84. However, the fourth power source 87 can be a remotely located external power source. The second bicycle electric shifting device 20 further includes an actuator driver 88 and a position sensor 89 for controlling the actuator 83 to accurately position the chain guide 81 with respect to the rear sprockets of the rear sprocket assembly RA.

In order to receive and process the wireless control signals from the second operating device 16, the second additional wireless receiver 85 is configured to wirelessly receive the control signals from the second wireless transmitter 56. That is, the additional receiver 65 is configured to wirelessly receive the wireless signals from the transmitter 41. As seen in FIG. 9, the second additional controller 84 is programed to periodically operate the second additional wireless receiver 85 for a predetermined listening period A to receive the control signals from the first wireless transmitter 46, as explained below. The second additional controller 84 is programed to periodically suspend an operation of the second additional wireless receiver 85 for a predetermined non-listening period B after the predetermined listening period A passes.

The second additional controller 84 is programmed to determine whether each of the wireless signals received by the second additional wireless receiver 85 is the wireless control signal based on the particular frequency of the control signal and/or an identifier included in the control signal. When the second additional controller 84 determines that at least one of the wireless signals received by the second additional wireless receiver 85 is the control signal, the second additional wireless transmitter 86 is configured to transmit an acknowledgement signal in response to the at least one of the wireless signals. In other words, when the additional controller 67 determines that at least one of the wireless signals received by the additional receiver 65 is the control signal, the additional transmitter 66 is configured to transmit an acknowledgement signal in response to the at least one of the wireless signals. More specifically, when the second additional controller 84 determines that at least one of the wireless signals that the second additional wireless receiver 85 receives in one predetermined listening period A, the second additional wireless transmitter 86 is configured to transmit the acknowledgement signal in response to the at least one of the wireless signals. The second wireless receiver 57 of the second operating device 16 is configured to wirelessly receive the acknowledgement signal from the second bicycle electric shifting device 20. In other words, the receiver 42 is configured to wirelessly receive the acknowledgement signal from the additional electric component 17. Further, the second additional controller 84 is programmed to operate the actuator 83 based on at least one of the control signals being received by the second additional wireless receiver 85.

The second additional controller 84 is preferably a microcomputer that includes conventional components such as includes a central processing unit (CPU), an input interface circuit, an output interface circuit, and storage devices such as a ROM (Read Only Memory), a RAM (Random Access Memory), and/or a FLASH memory. The second additional controller 84 is programmed to process the wireless control signals received from the second additional wireless receiver 85, and to control the operation of the actuator 83 using the actuator driver 88 and the position sensor 89. As explained below, the second additional controller 84 is also programmed to control the operation of the second additional wireless receiver 85 in such a manner to reduce the power consumption of the fourth power source 87.

Figure 8:
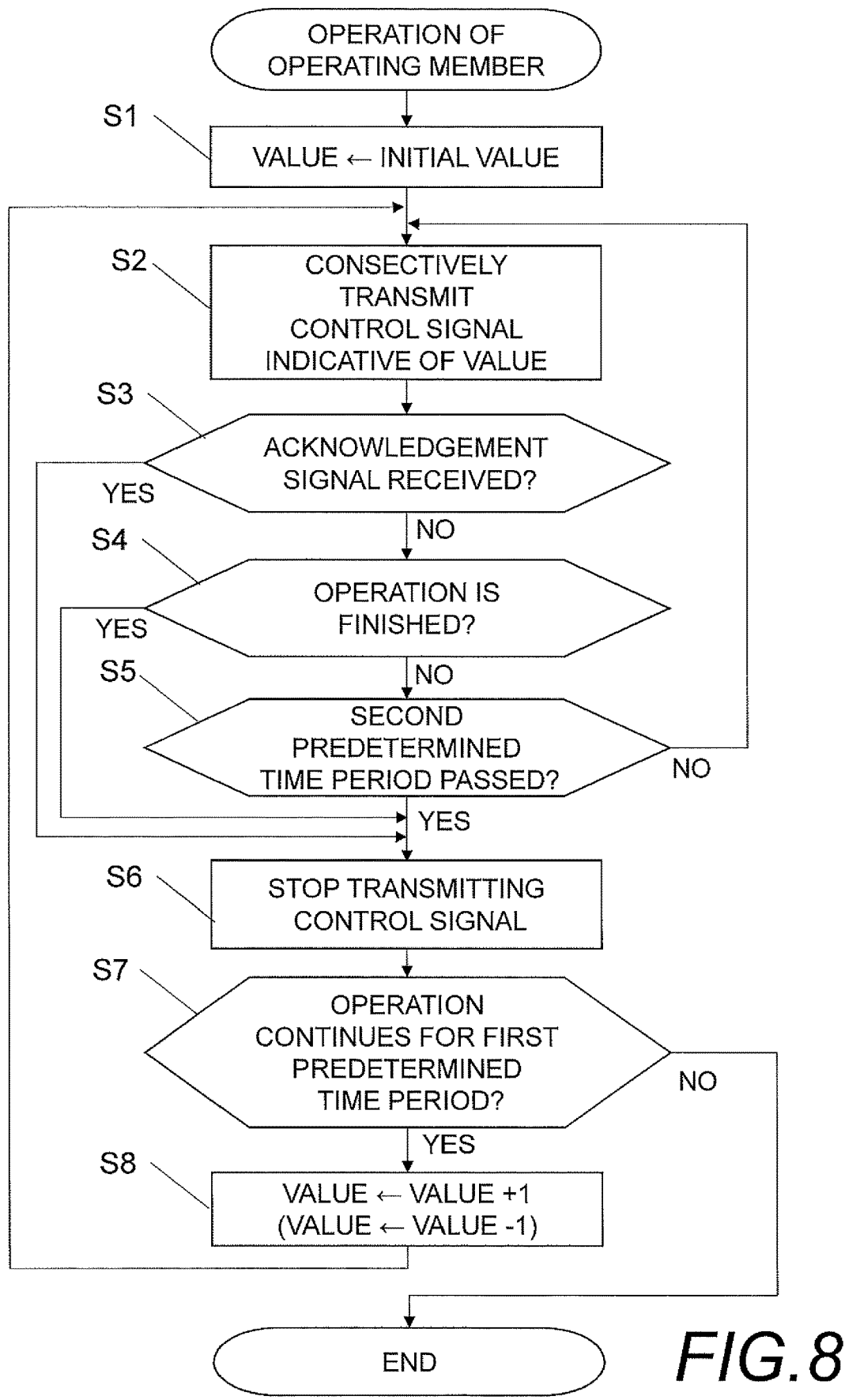
FIG. 8 is a flow chart illustrating a control process executed by the controller of the electric component in response to operation of the operating member.

Referring now to FIGS. 7 to 9, detailed operation of the control system 12 will now be more generically discussed. FIG. 8 shows a flow chart of a control process executed by the controller 40 of the electric component 13 in response to operation of one of the operating members 26, 28, 36, and 38, When the at least one of the operating member 26, 28, 36, and 38, a value of a control signal to be transmitted is set (Step S1). This value corresponds to a speed stage to be changed. The storage device of the controller 40 stores a current speed stage of each of the first bicycle electric shifting device 18 and the second bicycle electric shifting device 20 and the controller calculate the value to be changed. For example, when the current speed stage is three and the first operating member 36 is operated, the value is four. When the current speed stage is three and the second operating member 38 is operated, the value is 2. When the current speed stage is one and the first operating member 26 is operated, the value is two. When the current speed stage is two and the second operating member 28 is operated, the value is 1.

FIG. 9 shows an example of the communication timing diagram when the first operating member 36 is operated. However, a substantially same timing diagram can be applied when the second operating member 38 is applied. In addition, if the crank assembly CA includes more than two front sprockets, the substantially same timing diagram can be applied when the first operating member 26 or the second operating member 28 is operated. As seen in FIGS. 8 and 9, after the value is set (Step S1), the controller 40 is configured to control the transmitter 41 to consecutively transmit one of the wireless signals as a first control signal in response to an operation of the at least one operating member (at least one of 26, 28, 36, and 38) until the receiver 42 receives the acknowledgement signal (Until Yes in Step S3). (Step S2). More specifically, the controller 40 is configured to control the transmitter 41 to periodically transmit the wireless signals (the first control signals) at intervals of a third predetermined time period TP3 until the receiver 42 receives the acknowledgement signal. In the illustrated example shown in FIG. 9, the second controller 54 is configured to control the second wireless transmitter 56 to consecutively transmit one of the wireless signals as the first control signal in response to an operation of the first operating member 36 until the second wireless receiver 57 receives the acknowledgement signal. The second controller 54 is configured to control the second wireless transmitter 56 to periodically transmit the wireless signals (the first control signals) at intervals of the third predetermined time period TP3 until the second wireless receiver 57 receives the acknowledgement signal. Preferably, the third predetermined time period TP3 is shorter than the predetermined non-listening period B. The first control signal includes the value set at Step S1. Further, the first control signal can have a particular frequency such that the second bicycle electric shifting device 20 can decode the first control signal and/or can have an identifier such as a particular code, which identifies that the second bicycle electric shifting device 20 as a destination.

Then, when the additional receiver 65 receives the first control signal in the predetermined listening period A, the additional controller 67 changes the speed stage of the shifting device (e.g. the second bicycle electric shifting device 20) in accordance of the value included in the first control signal received by the additional receiver 65, thereby as shown in FIG. 9, the speed stage is changed from "first" to "second". In addition, the additional transmitter 66 transmits the acknowledgement signal. As seen in FIGS. 8 and 9, the controller 40 is configured to control the transmitter 41 to stop transmitting the first control signal (Step S5) when the receiver 42 wirelessly receives the acknowledgement signal (the ACK signal) (Yes in Step S3). In the illustrated example shown in FIG. 9, the second controller 54 is configured to control the second wireless transmitter 56 to stop transmitting the first control signal when the second wireless receiver 57 wirelessly receives the ACK signal.

Figure 10:
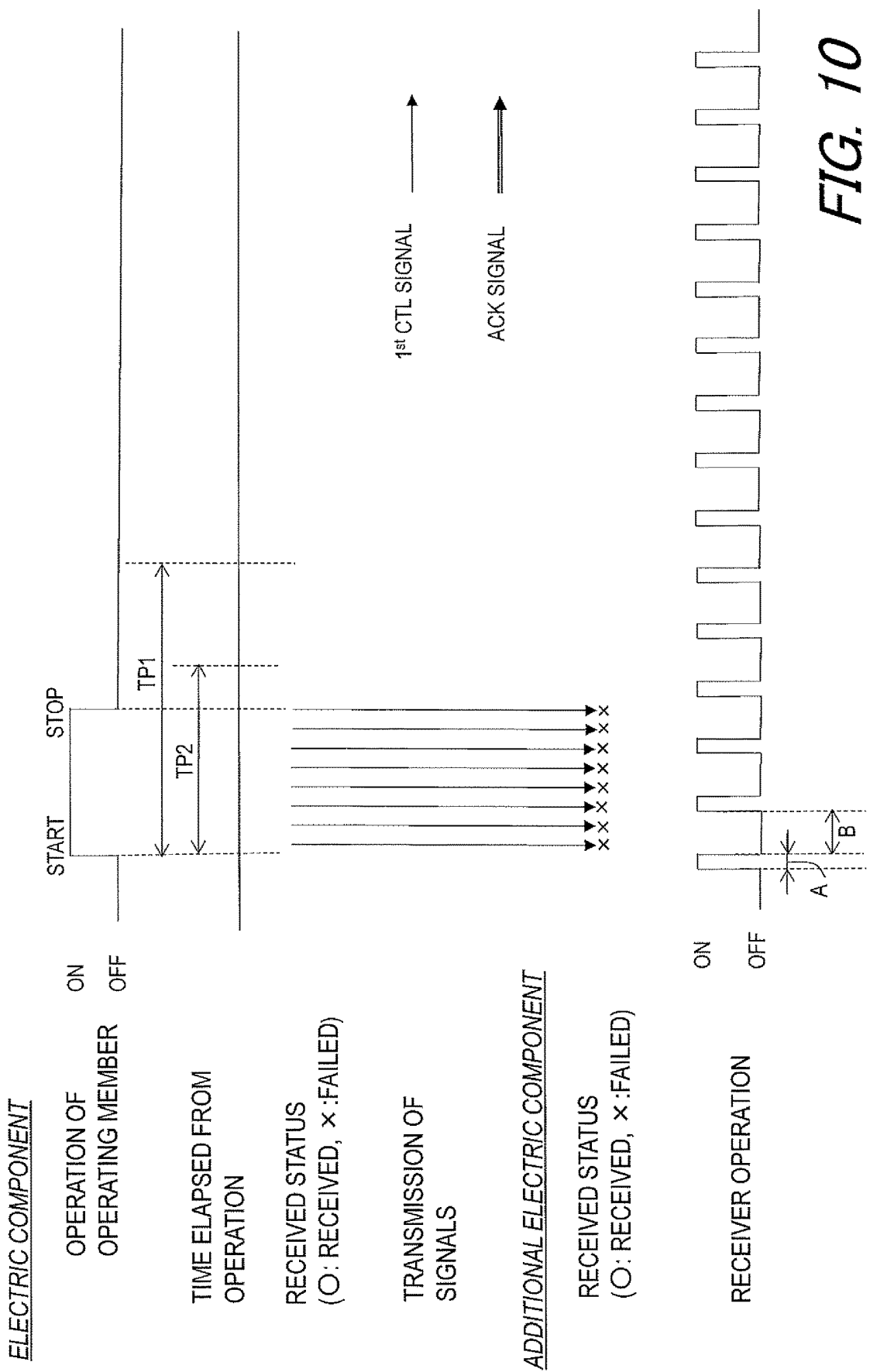
FIG. 10 is one communication timing diagram illustrating exemplary communications in which the controller executes the control process of FIG. 8 in a case that the additional electric component fails to receive the first control signals.
Figure 11:
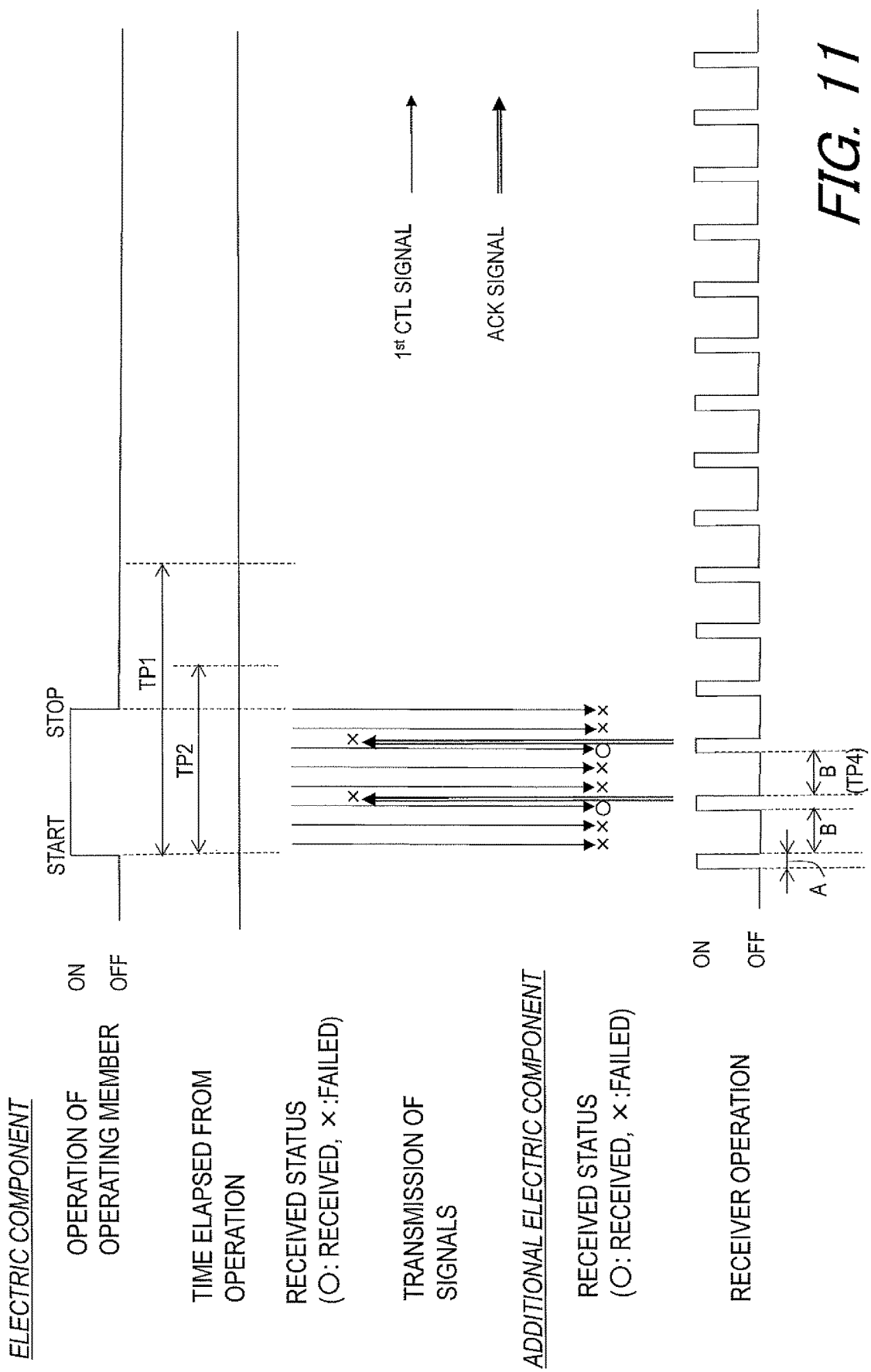
FIG. 11 is one communication timing diagram illustrating exemplary communications in which the controller executes the control process of FIG. 8 in a case that the electric component fails to receive the acknowledgement signals.

When the bicycle 10 is located in a bad electromagnetic (EM) environment, for example, the receiver 42 may not wirelessly receive the ACK signal due to failure of receiving the first control signals by the additional electric component 17 (See FIG. 10) or failure of receiving the ACK signals by the electric component 13 even though the predetermined listening period A passes after the at least one of the operating members 26, 28, 36, and 38 is operated (See FIG. 11). In this case, as shown in FIGS. 8, 10 and 11, the controller 40 is configured to control the transmitter 41 to consecutively transmit the first control signal while the at least one operating member (at least one of 26, 28, 36, and 38) is operated. (Step S2 after No in Step S3, No in Step S4, and No is Step S5) When operation of the at least one operating member (at least one of 26, 28, 36, and 38) is finished (Yes in Step S4), the controller 40 is configured to control the transmitter 41 to stop transmitting the first control signal (Step S6). Further, as seen in FIG. 11, the additional transmitter 66 is configured to wirelessly retransmit the acknowledgement signal to the receiver 42 if the additional receiver 65 wirelessly receives from the transmitter 41 a wireless signal in response to which the transmitter 41 transmits the acknowledgement signal. More specifically, the additional transmitter 66 is configured to retransmit the acknowledgement signal to the receiver 42 if the additional receiver 65 wirelessly receives the wireless signal (e.g. the first control signal) after a fourth predetermined time period TP4 has passed since the additional transmitter 66 transmits the acknowledgement signal. The fourth predetermined time period TP4 is equal to the predetermined non-listening period B. In this case, the additional controller 67 is programmed to ignore or abandon the wireless signals in response to which the transmitter 41 transmits the acknowledgement signal for a second predetermined time period TP2 after the acknowledgement signal is transmitted.

Figure 12:
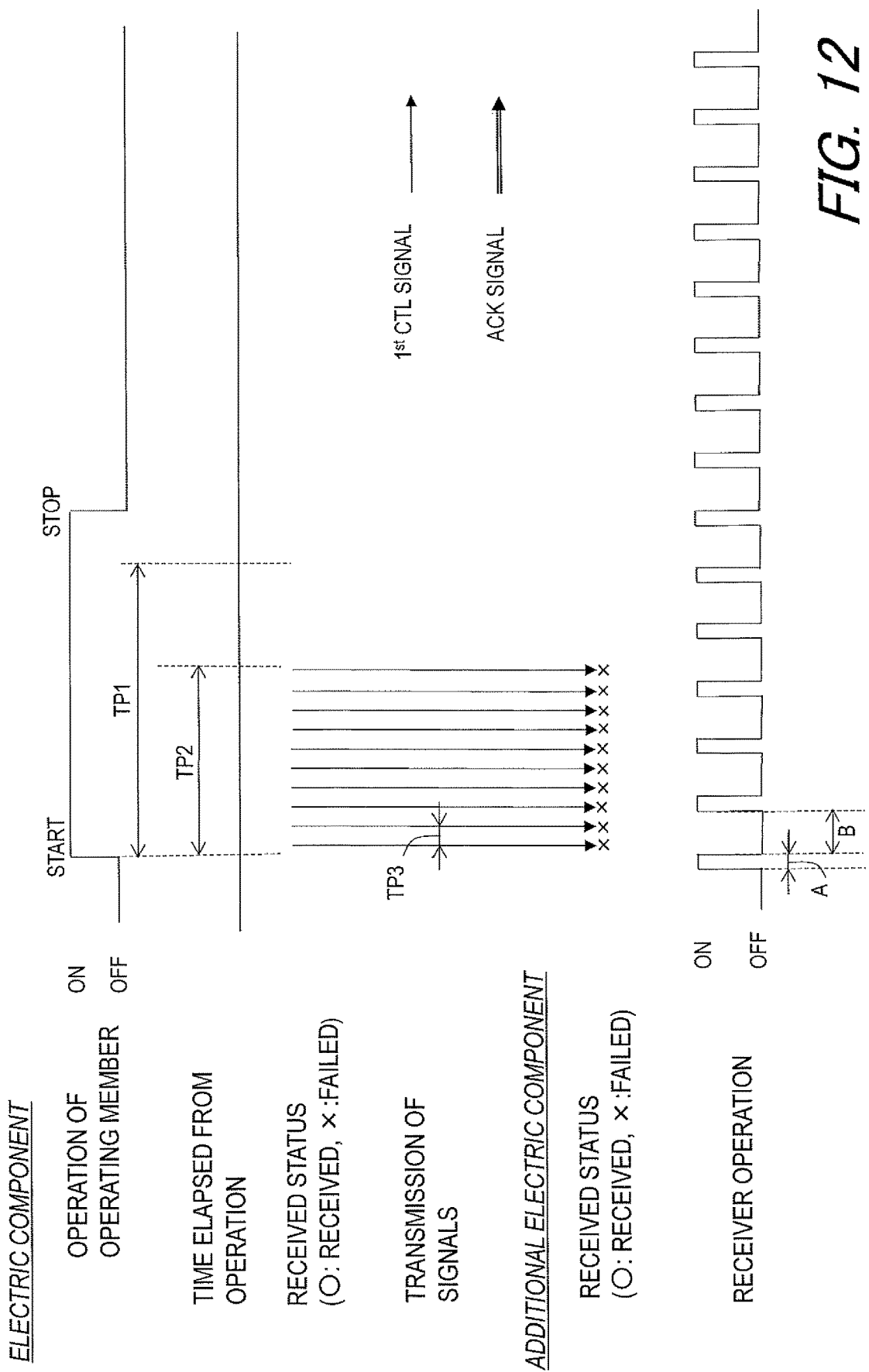
FIG. 12 is another communication timing diagram illustrating exemplary communications in which the controller executes the control process of FIG. 8 in a case that the additional electric component fails to receive the first control signals.
Figure 13:
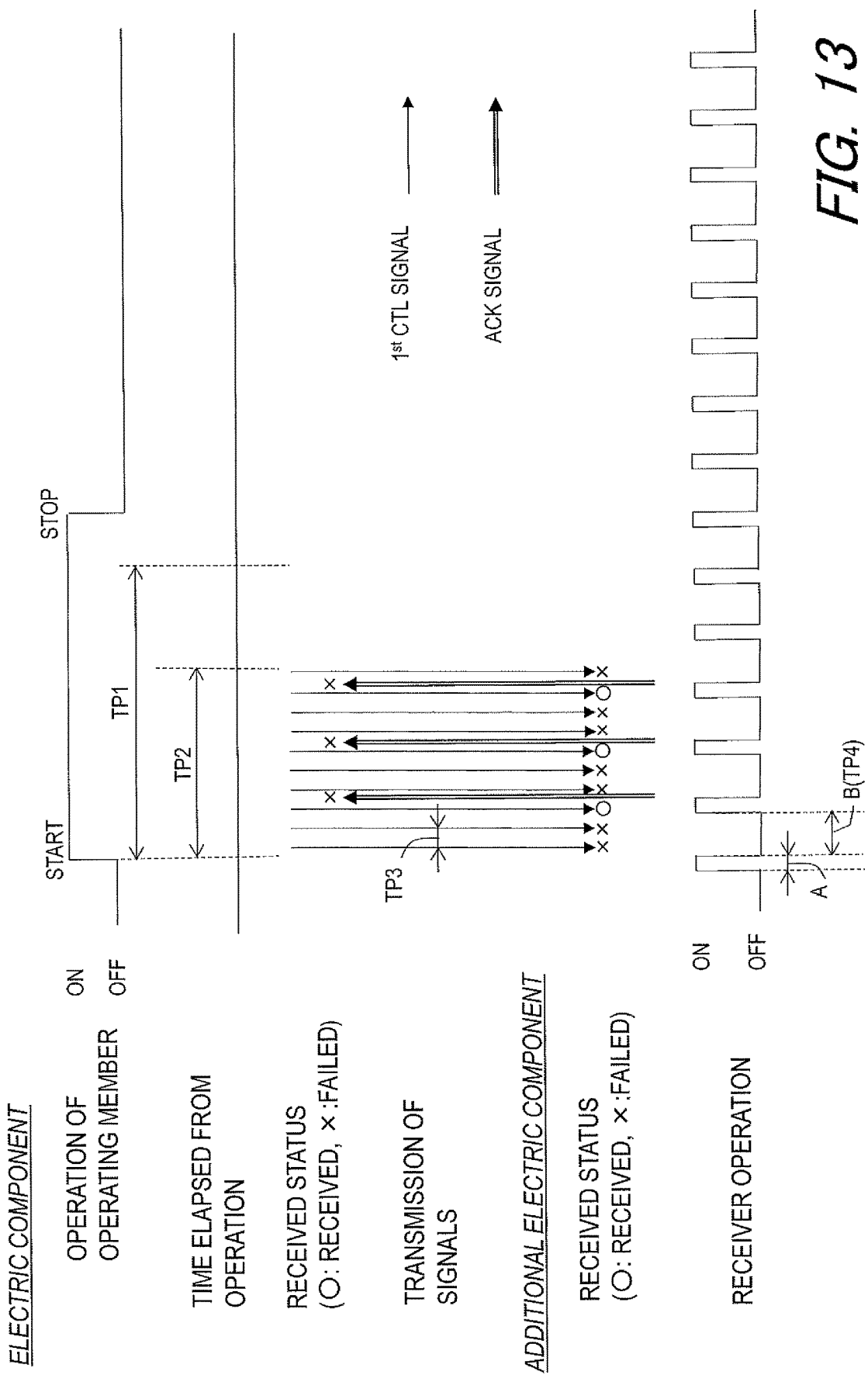
FIG. 13 is another communication timing diagram illustrating exemplary communications in which the controller executes the control process of FIG. 8 in a case that the electric component fails to receive the acknowledgement signals.

As seen in FIGS. 8, 12, and 13, the controller 40 is configured to control the transmitter 41 to stop transmitting the first control signal (Step S6) when the second predetermined time period TP has passed since a time point from when the operation of the at least one operating member (at least one of 26, 28, 36, and 38) is started until when the transmitter 41 starts transmitting the first control signal (Yes in Step S5). Preferably, the time point is a point of time when the transmitter 41 starts transmitting the first control signal.

Then, as seen in FIGS. 8 and 9, if the operation of the at least one operating member (at least one of 26, 28, 36, and 38) continues for a first predetermined time period TP1 after the time period (Yes in Step S7), the value of a control signal is incremented or decremented by 1 from that of the first control signal (Step S8). More specifically, if the operation of the first operating member 26, 36 continues for the first predetermined time period TP1, the value of a control signal is incremented by 1 from that of the first control signal. If the operation of the second operating member 28, 38 continues for the first predetermined time period TP1, the value of a control signal is decremented by 1 from that of the first control signal. In the following description, a control signal a value of which is incremented or decremented from that of the first control signal can be referred to as a second control signal. Then, the controller 40 is configured to consecutively transmit the second control signal (Step S2). Briefly speaking, as explained in Steps S7, S8, and S2, the controller 40 is configured to control the transmitter 41 to transmit another of the wireless signals as the second control signal when the first predetermined time period TP1 passed since the time point from when the operation of the at least one operating member (at least one of 26, 28, 36, and 38) is stared until when the transmitter 41 starts transmitting the first control signal. Preferably, the controller 40 is configured to control the transmitter 41 to transmit the second control signal when the first predetermined time period TP1 has passed since the transmitter 41 starts transmitting the first control signal. The first predetermined time period TP1 is equal to or longer than the second predetermined time period TP2 and is longer than the third predetermined time period TP3 and the fourth predetermined time period TP4. Accordingly, the second predetermined time period TP2 is equal to or smaller than the first predetermined time period TP1. The third predetermined time period TP3 is smaller than the first predetermined time period TP1. The fourth predetermined time period TP4 is smaller than the first predetermined time period TP1.

In the illustrated example shown in FIG. 9, when the additional receiver 65 receives the second control signal in the predetermined listening period A, the additional controller 67 changes the speed stage of the shifting device (e.g. the second bicycle electric shifting device 20) in accordance of the value included in the second control signal received by the additional receiver 65, thereby as shown in FIG. 9, the speed stage is changed from "second" to "third". Accordingly, the additional electric component 17 is configured to sequentially change the speed stage of the additional electric component 17 such that a gear ratio of the shifting device (the second bicycle electric shifting device 20) increases upon receiving the first control signal and upon receiving the second control signal subsequent to the first control signal in response to a first operation of the at least one operating member (at least one of 26, 28, 36, and 38. In the illustrated example shown in FIG. 9, the first operation of the at least one operating member means continuously operating the first operating member 36. However, the first operation can be a different operation, for example, a simultaneous operation of the first operating members 26 and 36.

Figure 14:
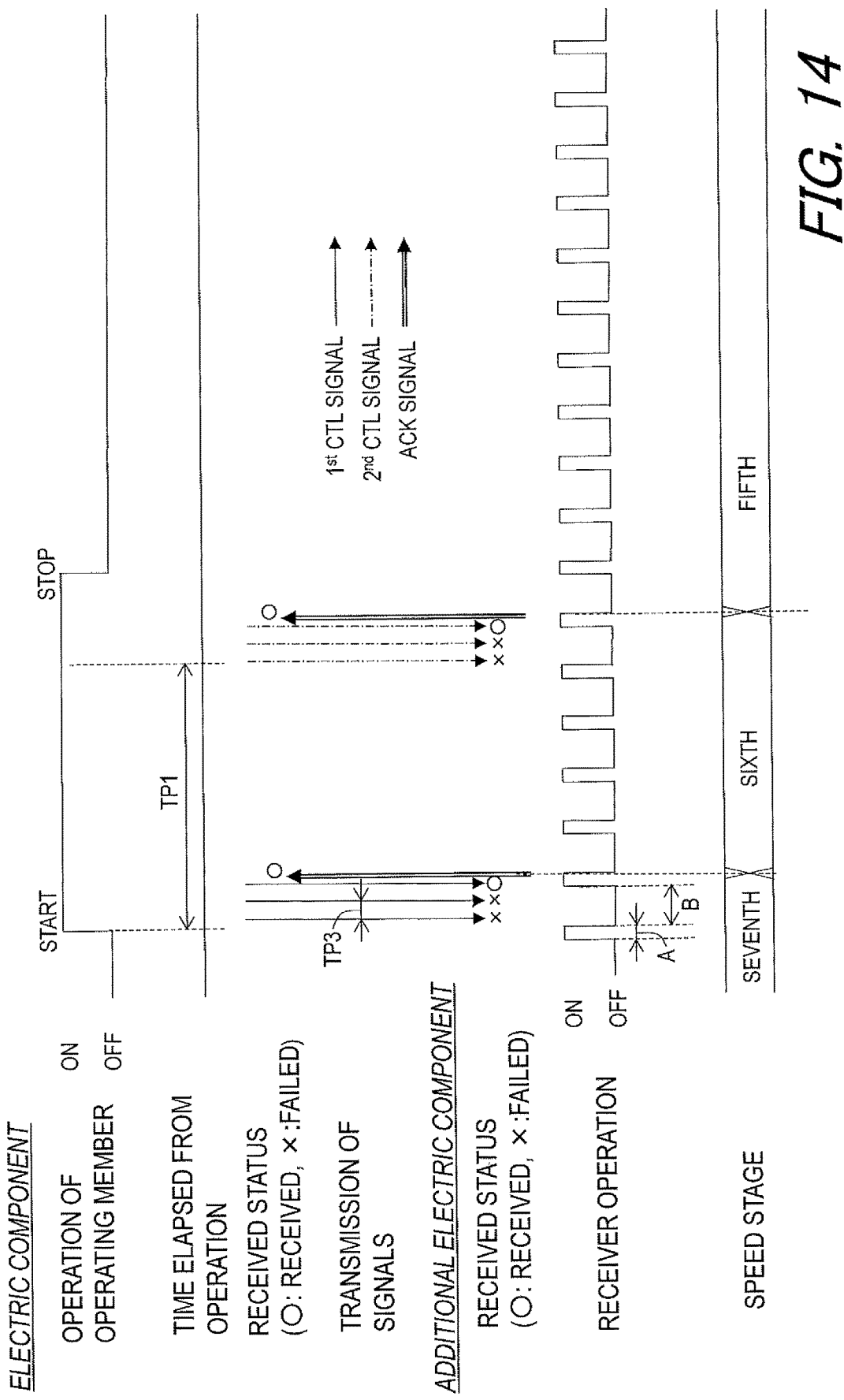
FIG. 14 is another communication timing diagram illustrating exemplary communications in which the controller executes the control process of FIG. 8.

FIG. 14 shows an example of the communication timing diagram when the second operating member 38 is continuously operated. Due to the reasons explained above, in this example, when the additional receiver 65 receives the first control signal in the predetermined listening period A, the additional controller 67 changes the speed stage of the shifting device (e.g. the second bicycle electric shifting device 20) in accordance of the value included in the first control signal received by the additional receiver 65, thereby as shown in FIG. 14, the speed stage is changed from "seventh" to "sixth". When the additional receiver 65 receives the second control signal in the predetermined listening period A, the additional controller 67 changes the speed stage of the shifting device (e.g. the second bicycle electric shifting device 20) in accordance of the value included in the second control signal received by the additional receiver 65, thereby as shown in FIG. 14, the speed stage is changed from "sixth" to "fifth". Accordingly, the additional electric component 17 is configured to sequentially change the speed stage of the additional electric component 17 such that a gear ratio of the shifting device (the second bicycle electric shifting device 20) decreases upon receiving the first control signal and upon receiving the second control signal subsequent to the first control signal in response to a second operation of the at least one operating member (at least one of 26, 28, 36, and 38). In the illustrated example shown in FIG. 14, the second operation of the at least one operating member means continuously operating the second operating member 38. Accordingly, the second operation is different from the first operation. The second operation can be a different operation from the continuous operation of the second operating member 38, for example, a simultaneous operation of the second operating members 28 and 38.

Figure 15:
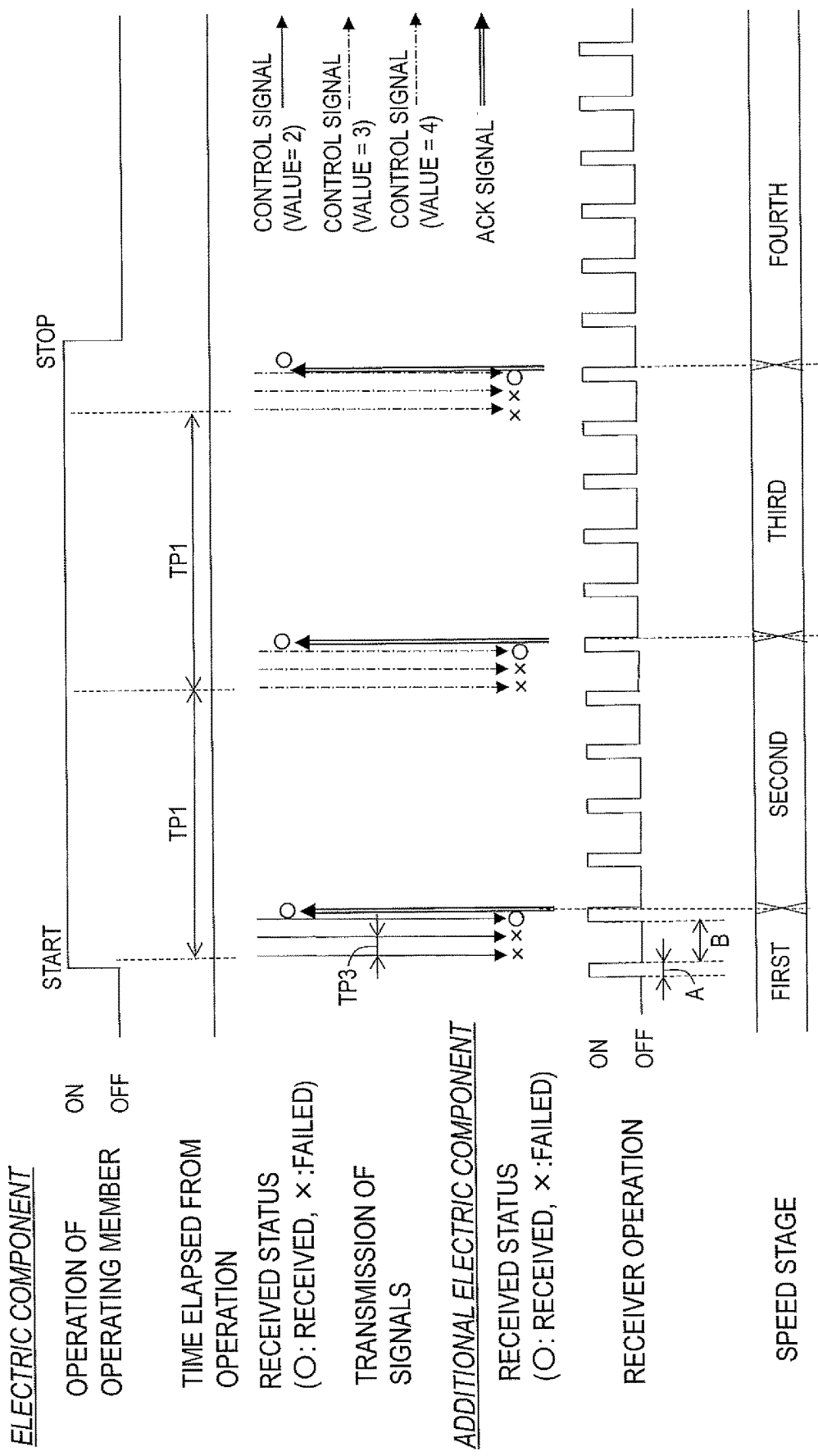
FIG. 15 is a communication timing diagram illustrating exemplary communications in which the controller executes the control process of FIG. 8 in a case that an operation of the at least one operating member continues for more than two of the first predetermined time periods.

FIG. 15 is a communication timing diagram illustrating exemplary communications in which the controller executes the control process of FIG. 8 in a case that an operation of the first operating member 36 continues for more than two of the first predetermined time periods TP1. In FIG. 15, each of the control signals are illustrated as a control signal (value=2), a control signal (value=3), and a control signal (value=5). In a similar manner to that shown in FIG. 9, the ordinal number of the speed stage is increased as a time elapses since the operation of the first operating member 36 starts. In this case, each of a pair of the control signal (value=2) and the control signal (value=3) and a pair of the control signal (value=3) and the control signal (value=4) can be a pair of the first control signal and the second control signal. Accordingly, the first control signal is not always a signal transmitted promptly after the operation of the at least one operating member (at least one of 26, 28, 36, and 38) is started.

The control system 12 has the following features.

Since the electric component 13 consecutively transmits the first control signal until it receives the acknowledgement signal from the additional electric component 17, it is possible to enhance operability of the human powered vehicle 1. In addition, since the transmitter 41 is configured to stop transmitting the first control signal when the receiver 42 wirelessly receives the acknowledgement signal, it is possible to prevent the transmitter 41 from transmitting unnecessary wireless signals, thereby the electric component can save electric power. Further, since the transmitter 41 is configured to stop transmitting the first control signal when the receiver 42 wirelessly receives the acknowledgement signal, multiple gear changes can be performed by a user's continuous single operation, thereby it is possible to further enhance usability of the human powered vehicle 1.

OTHER MODIFICATIONS

Figure 16:
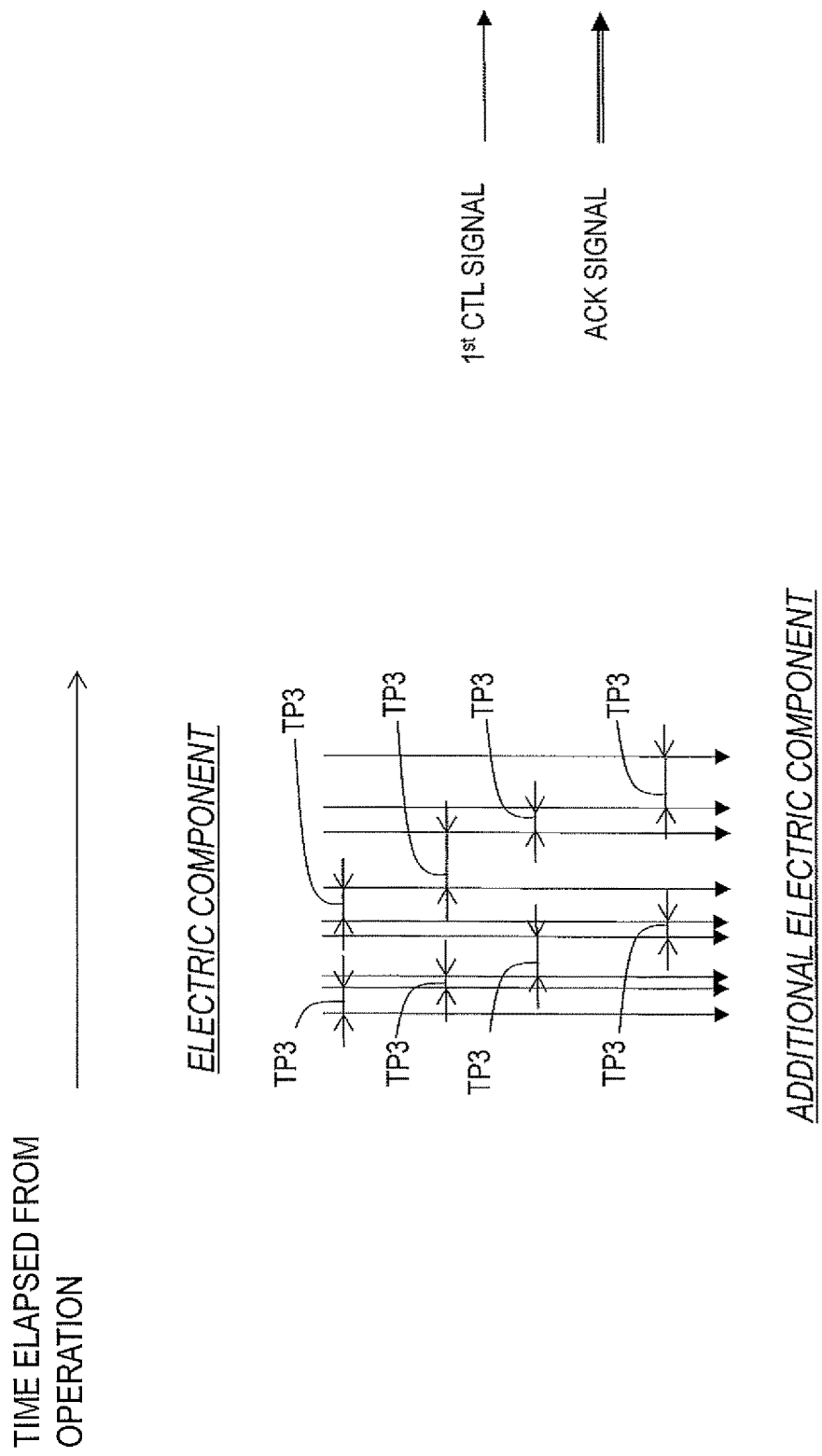
FIG. 16 shows an example in which the controller randomly change a length of the third predetermined time period.

In the illustrated embodiment, the third predetermined time period TP3 is fixed. However, as shown in FIG. 16, the controller 40 can be configured to randomly change a length of the third predetermined time period TP3.

Figure 17:
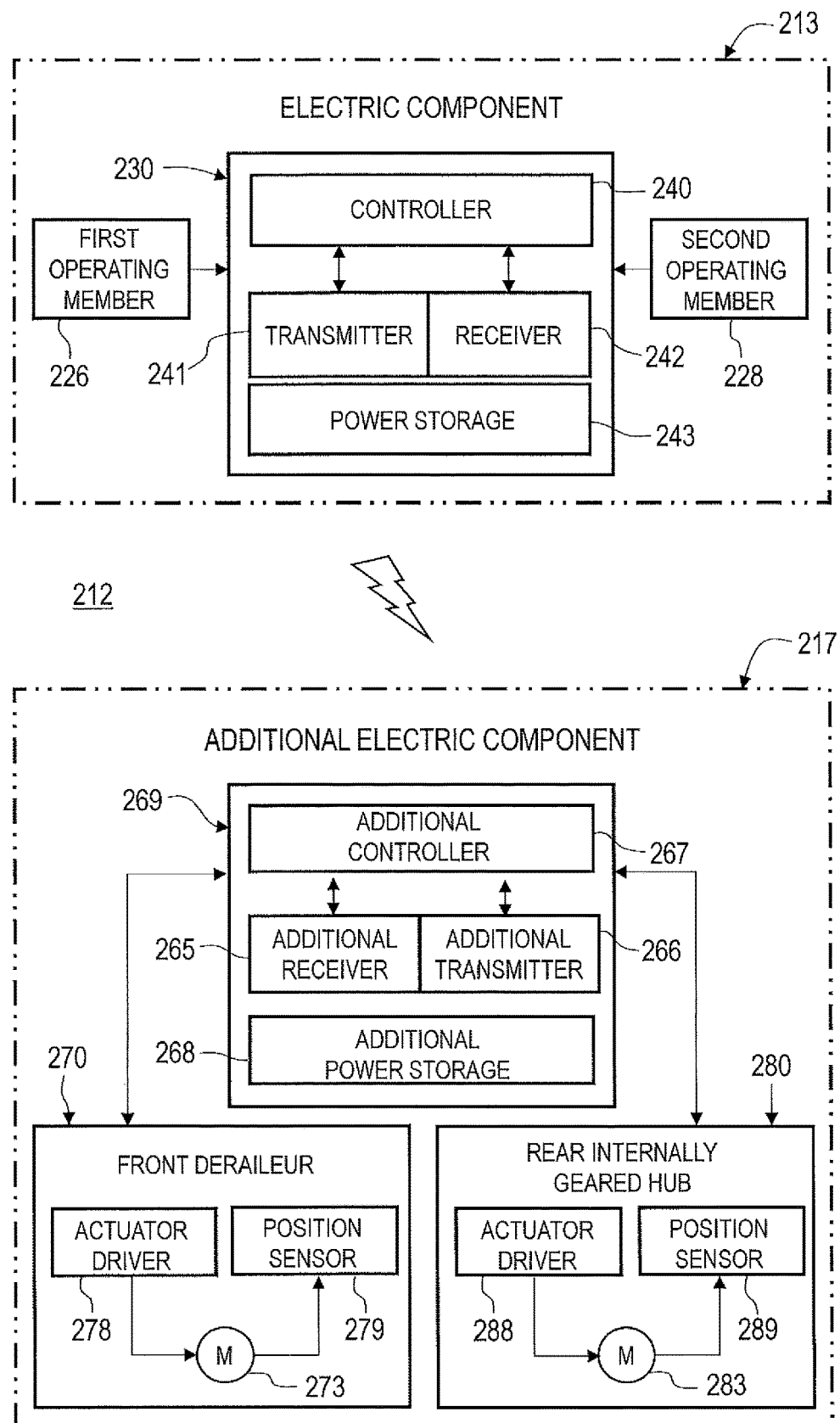
FIG. 17 is a simplified schematic block diagram of an example of a control system having an electric component and an additional electric component including a front derailleur and a rear internally geared hub.

Referring now to FIG. 17, another simplified schematic block diagram of a control system 212 is illustrated. Here, the control system 212 is a bicycle electric shifting apparatus that includes an operating device 213 as the electric component and a bicycle electric shifting device 217 as the additional electric component. Here, the operating device 213 includes a first operating member 226, a second operating member 228 and a first control unit 230. The first and second operating members 226 and 228 are directly connected by wires (diagrammatically represented by arrows) to the first control unit 230 to form the electric component 213. The first control unit 230 includes a controller 240, a transmitter 241, and a receiver 242. Here, the first control unit 230 further includes a power storage 243 having a hydrogen powered fuel cell, a rechargeable battery, or a capacitor. The controller 240 is programmed in the same way as the controller 40, discussed above to carry out the communication illustrated in FIGS. 8 to 16.

The bicycle electric shifting device 217 includes an additional control unit 269 and at least one actuating unit such as an actuator 273 as explained below. The additional control unit 269 includes an additional controller 267, an additional receiver 265, and an additional transmitter 266. Here, the additional control unit 269 further includes an additional power storage 268 having a hydrogen powered fuel cell or a rechargeable battery. The additional controller 267 is programmed in the same way as the additional controller 67, discussed above to carry out the communication illustrated in FIGS. 8 to 16.

The bicycle electric shifting device 217 further includes a bicycle front derailleur 270 that is directly connected by at least one wire (diagrammatically represented by an arrow) to the additional control unit 269. In this way, the additional control unit 269 and the bicycle front derailleur 270 are integrated to form the additional electric component. The bicycle front derailleur 270 is identical to the first bicycle electric shifting device 18, discussed above. The bicycle front derailleur 270 includes the actuator 273 that is controlled by the additional control unit 269 via an actuator driver 278. The bicycle front derailleur 270 further includes a position sensor 279 that sends signals to the additional control unit 269 to aids in the additional control unit 269 controlling the actuator 273, which is in the form of a reversible electric motor.

In the embodiment of FIG. 17, the bicycle electric shifting device 217 includes two actuator units, i.e., the actuator 273 and an actuator 283, that are controlled by the additional control unit 269. The bicycle electric shifting device 217 further includes a rear internally geared hub 280 that is directly connected by at least one wire (diagrammatically represented by an arrow) to the additional control unit 269. Thus, the additional control unit 269 is used to control both the bicycle front derailleur 270 and the rear internally geared hub 280. In this way, the additional control unit 269, the bicycle front derailleur 270, and the rear internally geared hub 280 are integrated to form the additional electric component. The rear internally geared hub 280 is a conventional bicycle electric shifting device, and thus will only be brief discussed. The rear internally geared hub 280 includes the actuator 283 that is controlled by the additional control unit 269 via an actuator driver 288. The rear internally geared hub 280 further includes a position sensor 289 that sends signals to the additional control unit 269 to aids in the additional control unit 269 controlling the actuator 283, which is in the form of a reversible electric motor.

Figure 18:
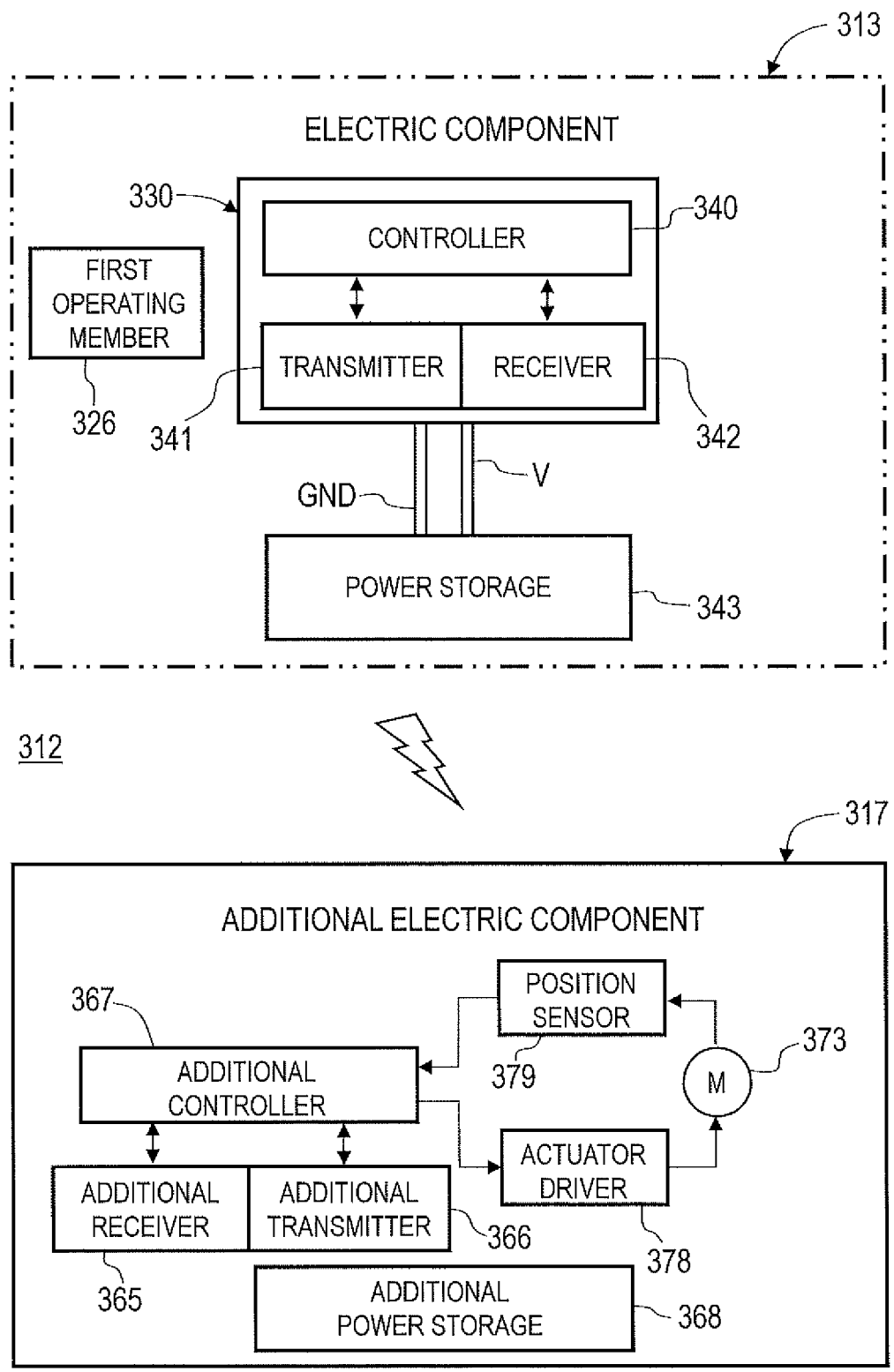
FIG. 18 is a simplified schematic block diagram of an example of a control system having an electric component including a seatpost control device and an additional electric component including an electric adjustable seatpost.

Referring now to FIG. 18, a simplified schematic block diagram of a control system 312 is illustrated. Here, the control system 312 is a bicycle electric seatpost adjustment apparatus that includes a seatpost operating device 313 as the electric component and a bicycle electric adjustable seatpost 317 as the additional electric component. Thus, as explained below, the electric component 313 includes a seatpost operating device and the additional electric component 317 includes a bicycle electric adjustable seatpost. Here, the seatpost operating device 313 includes a seatpost operating member 326 and a control unit 330. The seatpost operating member 326 is directly connected by at least one wire (diagrammatically represented by arrows) to the control unit 330 to form the electric component 313. The control unit 330 includes a controller 340, a transmitter 341, and a receiver 342. Here, the control unit 330 further includes a power source 343 having a hydrogen powered fuel cell, a rechargeable battery, or a capacitor. The controller 340 is programmed in the same way as the controller 40, discussed above to carry out the communication illustrated in FIGS. 8 to 16.

The bicycle electric adjustable seatpost 317 includes an actuating unit such as an actuator 373, an additional controller 367, an additional receiver 365, and an additional transmitter 366. Here, the bicycle electric adjustable seatpost 317 further includes an additional power source 368 having a hydrogen powered fuel cell or a rechargeable battery. The additional controller 367 is programmed in the same way as the additional controller 67, discussed above to carry out the communication illustrated in FIGS. 8 to 16.

The bicycle electric adjustable seatpost 317 includes the actuator 373 that is controlled by the additional controller 367 via an actuator driver 378. The bicycle electric adjustable seatpost 317 further includes a position sensor 379 that sends signals to the additional controller 367 to aids in the additional controller 367 controlling the actuator 373, which is in the form of a reversible electric motor. The bicycle electric adjustable seatpost 317 has more than two adjustable positions such that the controller 340 can sequentially change a height of the bicycle electric adjustable seatpost 317 in response to a continuous operation of the seatpost operating member 326.

Figure 19:
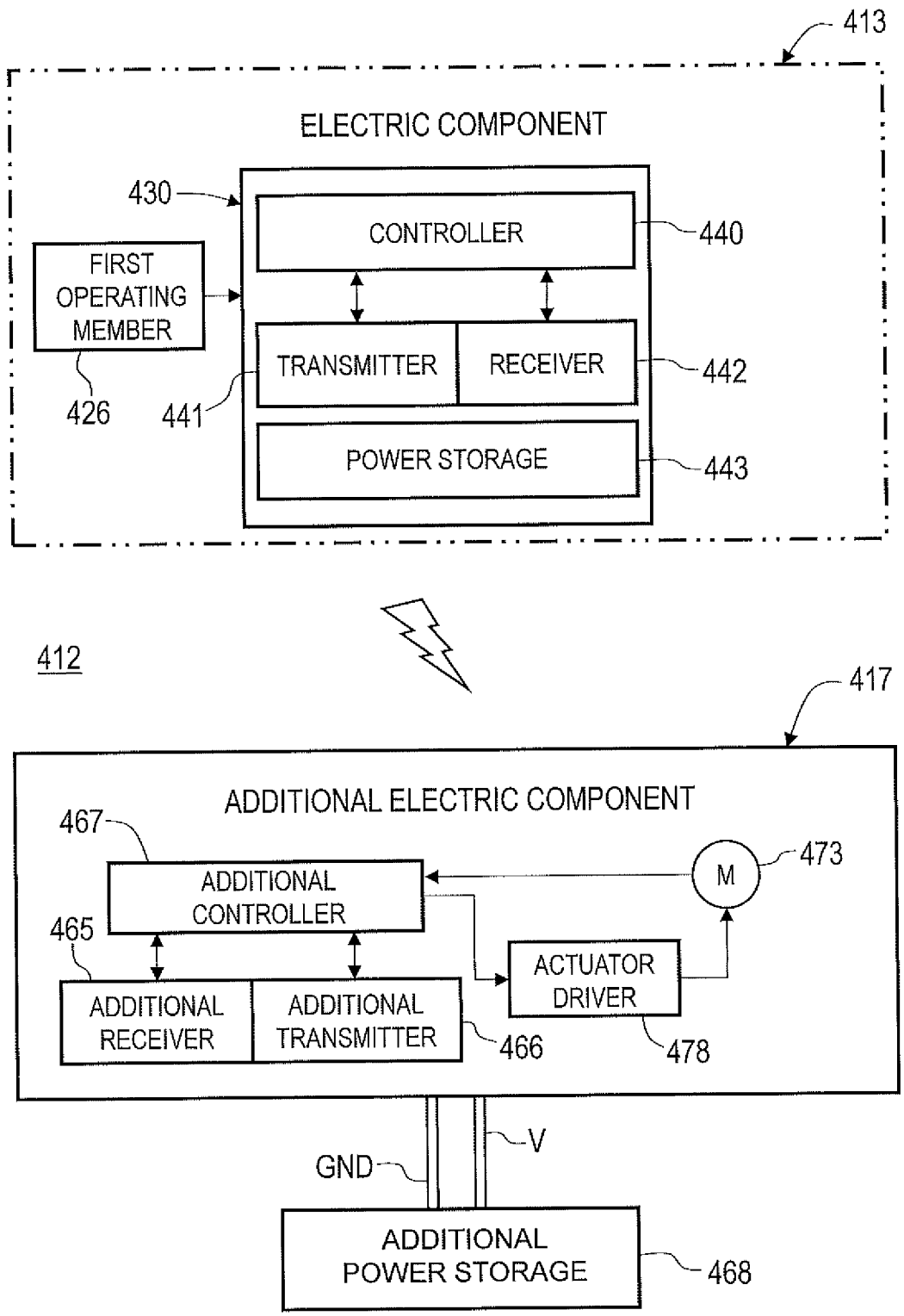
FIG. 19 is a simplified schematic block diagram of an example of a control system having an electric component including a power-assist control device and an additional electric component including an electric power-assist motor.

Referring now to FIG. 19, a simplified schematic block diagram of a control system 412 is illustrated. Here, the control system 412 includes a driving unit operating device 413 as the electric component and a driving unit 417 having an actuator 473 to assist pedaling of a rider or the bicycle 10 as the additional electric component. Thus, as explained below, the electric component 413 includes a driving unit operating device and the additional electric component 417 includes a driving unit having the actuator 473 to assist peddling of a rider of the bicycle 10. Here, the driving unit operating device 413 includes a driving unit operating member 426 and a control unit 430. The driving unit operating member 426 is directly connected by at least one wire (diagrammatically represented by arrows) to the control unit 430 to form the electric component 413. The control unit 430 includes a controller 440, a transmitter 441, and a receiver 442. Here, the control unit 430 further includes a power source 443 having a hydrogen powered fuel cell, a rechargeable battery, or a capacitor. The controller 440 is programmed in the same way as the controller 40, discussed above to carry out the communication illustrated in FIGS. 8 to 16.

The driving unit 417 includes an actuating unit such as the actuator 473, an additional controller 467, an additional receiver 465, and an additional transmitter 466, Here, the driving unit 417 further includes an additional power source 468 having a hydrogen powered fuel cell or a rechargeable battery. Thus, the additional electric component 417 includes the additional power source 468 that is electrically connected to the actuator 473 by an electrical wire. The additional controller 467 is programmed in the same way as the additional controller 67, discussed above to carry out the communication illustrated in FIGS. 8 to 16.

The driving unit 417 includes the actuator 473 that is controlled by the additional controller 467 via an actuator driver 478. The driving unit 417 has more than two assist ratios such that the controller 440 can sequentially change an assist ratio of the driving unit 417 in response to a continuous operation of the driving unit operating member 426.

While only selected embodiments have been chosen to illustrate the present invention, it will be apparent to those skilled in the art from this disclosure that various changes and modifications can be made herein without departing from the scope of the invention as defined in the appended claims.

The term "comprising" and its derivatives, as used herein, are intended to be open ended terms that specify the presence of the stated features, elements, components, groups, integers, and/or steps, but do not exclude the presence of other unstated features, elements, components, groups, integers and/or steps. This concept also applies to words of similar meaning, for example, the terms "have", "include" and their derivatives.

The terms "member", "section", "portion", "part", "element", "body" and "structure" when used in the singular can have the dual meaning of a single part or a plurality of parts.

The ordinal numbers such as "first" and "second" recited in the present application are merely identifiers, but do not have any other meanings, for example, a particular order and the like. Moreover, for example, the term "first element" itself does not imply an existence of "second element", and the term "second element" itself does not imply an existence of "first element." Further, some of the first threshold time period to the eighth threshold time period may have a same time length, but all of them may have a different time length.

The term "pair of", as used herein, can encompass the configuration in which the pair of elements have different shapes or structures from each other in addition to the configuration in which the pair of elements have the same shapes or structures as each other.

Finally, terms of degree such as "substantially", "about" and "approximately" as used herein mean a reasonable amount of deviation of the modified term such that the end result is not significantly changed.

Obviously, numerous modifications and variations of the present invention are possible in light of the above teachings. It is therefore to be understood that within the scope of the appended claims, the invention may be practiced otherwise than as specifically described herein.

What is claimed is:

1. An electric component for a human powered vehicle, comprising:
 a transmitter configured to wirelessly transmit wireless signals to an additional electric component for a human powered vehicle;
 a receiver configured to wirelessly receive an acknowledgement signal from the additional electric component;
 an operating member; and
 a controller configured to control the transmitter to consecutively transmit one of the wireless signals as a first control signal in response to an operation of the operating member until the receiver receives the acknowledgement signal, the controller being configured to control the transmitter to transmit another of the wireless signals as a second control signal when a first predetermined time period has passed regardless of operation of any other operating member than the operating member since a time point from when the operation of the operating member is started until when the transmitter starts transmitting the first control signal, the first control signal including a first setting parameter of the additional electric component, the second control signal including a second setting parameter of the additional electric component, the second setting parameter being set differently from the first setting parameter.

2. The electric component according to claim 1, wherein the controller is configured to control the transmitter to consecutively transmit the first control signal while the operating member is operated.

3. The bicycle electric component according to claim 1, wherein
the controller is configured to control the transmitter to stop transmitting the first control signal when the receiver wirelessly receives the acknowledgement signal.

4. The electric component according to claim 1, wherein the controller is configured to control the transmitter to stop transmitting the first control signal when a second predetermined time period has passed since the time point, the second predetermined time period being equal to or smaller than the first predetermined time period.

5. The electric component according to claim 1, wherein the controller is configured to control the transmitter to transmit the second control signal when the first predetermined time period has passed since the transmitter starts transmitting the first control signal.

6. The electric component according to claim 1, wherein the controller is configured to control the transmitter to periodically transmit the wireless signals at intervals of a third predetermined time period until the receiver receives the acknowledgement signal, the third predetermined time period being smaller than the first predetermined time period.

7. The electric component according to claim 6, wherein the controller is configured to randomly change a length of the third predetermined time period.

8. The electric component according to claim 1, further comprising:
a power storage to supply electric power to at least one of the controller, the transmitter, and the receiver.

9. The electric component according to claim 8, further comprising:
a power generator to generate the electric power in response to the operation of the operating member, the power storage being configured to store the electric power generated by the power generator.

10. The electric component according to claim 8, wherein the power generator is configured to generate the electric power in response to a movement of the operating member between a first position and a second position different from the first position.

11. A control system for a human powered vehicle, comprising:
the electric component according to claim 1; and
the additional electric component.

12. The control system according to claim 11, wherein the additional electric component includes
an additional receiver configured to wirelessly receive the wireless signals from the transmitter, and
an additional transmitter configured to wirelessly transmit the acknowledgement signal in response to at least one of the wireless signals.

13. The control system according to claim 12, wherein the additional transmitter is configured to wirelessly retransmit the acknowledgement signal to the receiver if the additional receiver wirelessly receives from the transmitter a wireless signal in response to which the transmitter transmits the acknowledgement signal.

14. The control system according to claim 13, wherein the additional transmitter is configured to retransmit the acknowledgement signal to the receiver if the additional receiver wirelessly receives the wireless signal after a fourth predetermined time period has passed since the additional transmitter transmits the acknowledgement signal, the fourth predetermined time period being smaller than the first predetermined time period.

15. The control system according to claim 12, wherein the additional electric component further includes a movable member and an actuator configured to move the movable member.

16. The control system according to claim 15, wherein the additional electric component includes a shifting device having a plurality of speed stages.

17. The control system according to claim 16, wherein the movable member includes a chain guide of a derailleur.

18. The control system according to claim 16, wherein the additional electric component is configured to sequentially change the speed stage of the additional electric component such that a gear ratio of the shifting device increases upon receiving the first control signal and upon receiving the second control signal subsequent to the first control signal in response to a first operation of the operating member, the additional electric component is configured to sequentially change the speed stage of
the additional electric component such that a gear ratio of the shifting device decreases upon receiving the first control signal and upon receiving the second control signal subsequent to the first control signal in response to a second operation of the operating member, and
the second operation is different from the first operation.

19. The electric component according to claim 1, wherein the second setting parameter is set differently from the first setting parameter due to continuous operation of the operating member for the first predetermined time period.

20. An electric component for a human powered vehicle, comprising:
a transmitter configured to wirelessly transmit wireless signals to an additional electric component for a human powered vehicle;
a receiver configured to wirelessly receive an acknowledgement signal from the additional electric component;
at least one operating member; and
a controller configured to control the transmitter to consecutively transmit one of the wireless signals as a first control signal in response to an operation of the at least one operating member until the receiver receives the acknowledgement signal, the controller being configured to control the transmitter to transmit another of the wireless signals as a second control signal when the at least one operating member has been continuously operated for a first predetermined time period regardless of operation of any other operating member than the at least one operating member since a time point from when the operation of the at least one operating member is started until when the transmitter starts transmitting the first control signal, the first control signal including a first setting parameter of the additional electric component, the second control signal including a second setting parameter of the additional electric component, the second setting parameter being set differently from the first setting parameter.

* * * * *